US006351475B1

(12) United States Patent
Okamura

(10) Patent No.: US 6,351,475 B1
(45) Date of Patent: Feb. 26, 2002

(54) MIXING APPARATUS WITH COMPATIBLE MULTIPLEXING OF INTERNAL AND EXTERNAL VOICE SIGNALS

(75) Inventor: Kazuhisa Okamura, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/115,616

(22) Filed: Jul. 13, 1998

(30) Foreign Application Priority Data

Jul. 14, 1997 (JP) ........................................... 9-188769

(51) Int. Cl.[7] ................................................ H04J 3/00
(52) U.S. Cl. ....................................... 370/498; 370/537
(58) Field of Search ................................ 370/398, 498, 370/537; 84/609, 610, 631, 454, 682; 434/307 A

(56) References Cited

U.S. PATENT DOCUMENTS 4,014,238 A * 3/1977 Southard ..................... 84/682
4,211,895 A * 7/1980 Davis et al. ................ 370/398
4,321,853 A * 3/1982 Tumblin ...................... 84/454
5,499,921 A * 3/1996 Some ..................... 434/307 A
5,652,797 A 7/1997 Okamura
5,824,935 A * 10/1998 Tamaka ....................... 84/631
5,827,990 A * 10/1998 Fujita .......................... 84/610
5,886,275 A * 3/1999 Kato et al. .................... 84/609

OTHER PUBLICATIONS

Derwent Abstract Accession No. 96–192639/20, JP 08063157, Yamaha Corporation, Mar. 8, 1996.

* cited by examiner

*Primary Examiner*—Salvatore Cangialosi
(74) *Attorney, Agent, or Firm*—Morrison & Foerster LLP

(57) ABSTRACT

A mixing apparatus is constructed for mixing input voice signals with each other to produce output voice signals. In the mixing apparatus, a generator has a predetermined number of internal channels for internally generating the predetermined number of input voice signals at each sample period divided into the predetermined number of timeslots to accommodate the predetermined number of the input voice signals within each sample period. A converter converts division of the sample period so as to increase a total number of the timeslots within each sample period, and distributes the predetermined number of the input voice signals to the increased number of the timeslots so as to create an extra number of free timeslots within each sample period. An interface can receive the extra number of input voice signals provided from the extra number of external channels of an external signal source disposed separately from the generator. A selector allocates the extra number of the input voice signals to the extra number of the free timeslots so as to accommodate within each sample period the total number of the input voice signals provided concurrently from both of the generator and the interface. A processor mixies the total number of the input voice signals with one another to produce the output voice signals.

31 Claims, 13 Drawing Sheets

FIG.6( a )

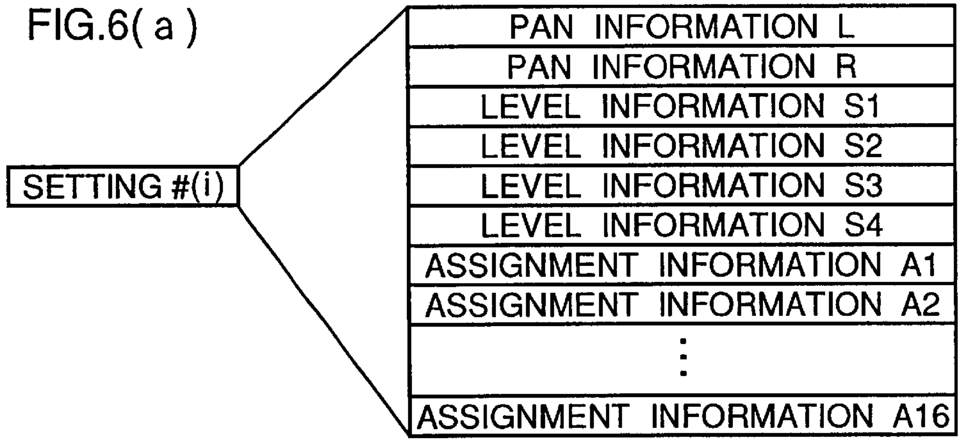

FIG.6( b )

| MULTIPLICATION COEFFICIENT M |
|---|
| M1=L+S1 |
| M2=R+S1 |
| M3=L+S2 |
| M4=R+S2 |
| M5=L+S3 |
| M6=R+S3 |
| M7=L+S4 |
| M8=R+S4 |

FIG.6( c )

| ASSIGNMENT INFORMATION A(j) | CONTENTS OF ASSIGNMENT INFORMATION |
|---|---|
| 000 | NOT ASSIGN TO OUTPUT CHANNEL CH(j) |
| 001 | ASSIGN RESULT WITH NO COEFFICIENT MULTIPLICATION TO L AND R OF OUTPUT CH(j) |
| 010 | ASSIGN RESULT WITH NO COEFFICIENT MULTIPLICATION ONLY TO L OF OUTPUT CH(j) |
| 011 | ASSIGN RESULT WITH NO COEFFICIENT MULTIPLICATION ONLY TO R OF OUTPUT CH(j) |
| 100 | ASSIGN RESULT OBTAINED BY MULTIPLICATION BY M1 TO L OF CH(j) AND<br>ASSIGN RESULT OBTAINED BY MULTIPLICATION BY M2 TO R OF OUTPUT CH(j) |
| 101 | ASSIGN RESULT OBTAINED BY MULTIPLICATION BY M3 TO L OF CH(j) AND<br>ASSIGN RESULT OBTAINED BY MULTIPLICATION BY M4 TO R OF OUTPUT CH(j) |
| 110 | ASSIGN RESULT OBTAINED BY MULTIPLICATION BY M5 TO L OF CH(j) AND<br>ASSIGN RESULT OBTAINED BY MULTIPLICATION BY M6 TO R OF OUTPUT CH(j) |
| 111 | ASSIGN RESULT OBTAINED BY MULTIPLICATION BY M7 TO L OF CH(j) AND<br>ASSIGN RESULT OBTAINED BY MULTIPLICATION BY M8 TO R OF OUTPUT CH(j) |

MIXING APPARATUS WITH COMPATIBLE MULTIPLEXING OF INTERNAL AND EXTERNAL VOICE SIGNALS

BACKGROUND OF THE INVENTION

The present invention generally relates to a mixing apparatus suitable for use in imparting effects to voice signals of plural channels generated by time-divisional multiplexing.

Recently, digital signal processors (DSPs) have been made available for performing various numerical computations on an inputted digital signal by executing plural control programs in various fields with advances in semiconductor fabrication technologies. For example, the DSP is used in electronic musical instruments. In this application, the DSP is used to formulate effect blocks for imparting sound effects to music tones or voices (hereinafter, voice refers to any type of sounds treated in audio technology). Namely, the DSP is adapted to impart different sound effects to voices in a parallel manner by means of desired combination of the effect blocks.

Generally, electronic musical instruments are equipped with a tone generator for generating a music tone or voice. The tone generator operates in a time-division multiplex manner to generate multiple channels of voice signals simultaneously. In such a case, a predetermined sound effect is created by the DSP as follows. Namely, the tone generator accumulates plural channels of voice signals at every sample period, and supplies results of this accumulation to the DSP through the plural channels. The DSP executes a predetermined effect algorithm, imparts predetermined sound effects to the received accumulation results in a parallel manner, and accumulates the voice signals imparted with the sound effects at every sample period. The digital voice signals resulted from the accumulation by the DSP are converted by a D/A converter into analog voice signals, which are then sounded.

As described, the prior-art constitution requires a mixing circuit for accumulating the voice signals for each of the channels in the tone generator and another mixing circuit for accumulating the voice signals for each of the channels in the DSP at every sample period. Each mixing circuit is composed of a multiplier and an accumulator, presenting a problem of a large circuit scale. It should be noted here that sharing the accumulator between the tone generator and the DSP is difficult because the tone generator operates in the time-division multiplex manner.

Meanwhile, in effect imparting by the DSP, it should be noted that the computation capability of the DSP is obviously limited. Therefore, installation of only one DSP limits the effects to be imparted. To overcome this problem, several measures are possible, such as installation of the DSP of higher performance and installation of plural DSPs. These measures are suitable for only professional-use of electronic musical instruments because of the resulting high-level specifications and tradeoff of increased fabrication cost. This problem may be circumvented by providing hardware extensibility such that an extra DSP satisfying professional users can be added as required to a main DSP that has performance enough for general users. However, this additive method requires considering compatibility of the extra DSP to the output of the tone generator and the input/output of the DSP installed as standard. Namely, extra DSPs cannot be added simply.

Recently, there are demands for imparting effects by the electronic musical instrument also to external inputs such as a voice signal generated by another electronic musical instrument and a voice signal inputted from a microphone. However, it is difficult to handle these external voice signals the same way as the internal voice signals generated by the tone generator operating in the time-division multiplex manner.

SUMMARY OF THE INVENTION

It is therefore an object of the present invention to provide a mixing apparatus that is small in entire circuit scale, easy in functional expansion, and easy in handling of external input voice signals.

The inventive sound mixing apparatus is constructed for synthesizing M channels of output voice signals from m channels of input voice signals. In the apparatus, first providing means provides n channels of input voice signals at a sample period or frame period that is arranged with n number of timeslots to accommodate the n channels of the input voice signals. Rearranging means rearranges the timeslots so as to increase the number of the timeslots from n to m within the frame period, and then distributes the n channels of the input voice signals to the rearranged timeslots so as to create m-n number of free timeslots within the frame period. Second providing means is disposed separately from the first providing means for providing at most m-n channels of input voice signals in addition to the n channels of the input voice signals. Allocating means allocates at most the m-n channels of the input voice signals to the m-n number of the free timeslots so as to accommodate within the frame period the m channels of the input voice signals provided from both of the first providing means and the second providing means. Mixing means mixes the m channels of the input voice signals with one another by time-division manner of the m channels to produce the M channels of the output voice signals.

According to the present invention, for the sake of time conversion, the rearranging means compressively increases the n timeslots corresponding to the n channels of the voice signals inputted by the first providing means to the m timeslots, which are greater than the n timeslots. The allocating means allocates or assigns the voice signal inputted by the second providing means to the free or space timeslots produced by the time conversion. The mixing means outputs the voice signals assigned to each timeslot to the output channels according to data indicative of the output destination. In the mixing means, accumulating means accumulates the input voice signals for every output channel at one frame period. Consequently, the voice signals inputted by the first and second providing means are accumulated in each output channel, thereby allowing the accumulating means to be shared. This arrangement contributes to a simplified overall constitution of the mixing apparatus. Further, according to the invention, the internal voice signals inputted by the first providing means and the external voice signals inputted by the second providing means are processed mutually equally. This holds true for the output channels. This arrangement allows the user to facilitate setting of the mixing. Because the input and output channels are compatible to the first and second providing means, the expansion of capabilities may be made with ease and other external inputs may be handled with ease. In addition, according to the invention, the input voice signals can be processed on a stereo basis, so that handling of the mixing apparatus is simplified for both the user and the electronic musical instrument associated with the present invention. Lastly, according to the invention, overflow is detected for each output channel during the accumulation of the input voice signals, thereby preventing the distortion due to the overflow from occurring on all of the output channels.

BRIEF DESCRIPTION OF THE DRAWINGS

FIG. 6(*a*) is a diagram describing control information about setting for processing each input channel of the above-mentioned mixing apparatus;

FIG. 6(*b*) is a diagram describing a multiplication coefficient to be determined by the information about setting;

FIG. 6(*c*) is a diagram describing contents of assignment information of the setting;

DETAILED DESCRIPTION OF PREFERRED EMBODIMENTS

This invention will be described in further detail by way of example with reference to the accompanying drawings.

1. Overall Constitution

Figure 1:
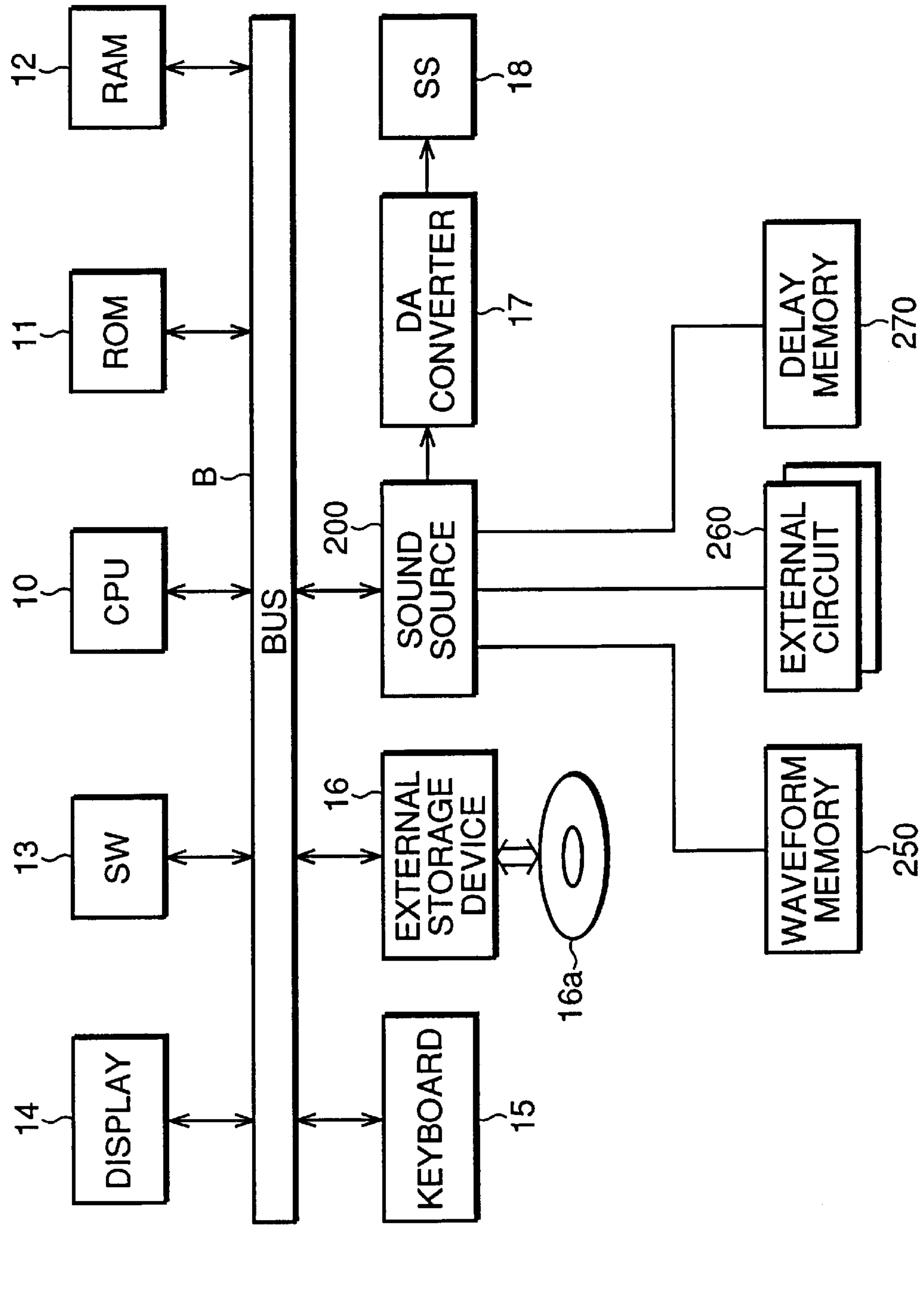
FIG. 1 is a block diagram illustrating constitution of an electronic musical instrument practiced as one preferred embodiment of the invention.

First, an electronic musical instrument incorporating a mixing apparatus associated with the present invention will be described. Referring to FIG. 1, there is shown a block diagram illustrating overall constitution of this electronic musical instrument. In the figure, a CPU 10 controls other components of the electronic musical instrument through a bus B. It should be noted that the bus B includes a control bus, a data bus, and an address bus. A ROM 11 stores a basic program and various data to be used by the CPU 10. A RAM 12 temporarily stores various data that are treated during the course of control operation by the CPU 10. A switch panel 13 is composed of switches for selecting timbres of music tones to be generated and for setting various modes, states and parameters. Control information set by this switch panel 13 is supplied to the CPU 10 through the bus B. A display 14 is constituted by a CRT or a liquid crystal display panel, and displays the control information inputted from the switch panel 13 and the currently set information under the control of the CPU 10. Especially, the display 14 displays an output channel suffering from overflow caused in the inventive mixing apparatus.

Reference numeral 15 denotes a keyboard having 88 number of keys. Each of these keys is provided with a key sensor (not shown) for detecting performance operation by a player on the keyboard 15. The key sensor supplies, to the CPU 10 through the bus B, key information such as a key code KC indicative of the pitch of the operated key, a key-on signal KON and a key-off signal KOFF, indicative of turning on and off respectively of a music tone in response to pressing and releasing of a key, and a key touch signal KT corresponding to key pressing speed. An external storage device 16 is composed of a floppy disk drive (FDD) or a hard disk drive (HDD) for storing various data. A machine readable medium such as a floppy disk 16*a* is used for installing program instructions to the electronic music instrument.

A sound source 200 constitutes 64 channels by time division to generate voice signals through each of the channels. In addition, the sound source 200 executes a predetermined algorithm to impart effects. To carry out these operations, the sound source 200 incorporates a DSP (Digital Signal Processor) for imparting effects, in addition to a tone generator or voice signal generating circuit. A waveform memory 250 stores plural pieces of basic waveforms for each timbre. An external circuit 260 includes an external signal source for supplying voice signals other than those generated by the sound source 200 and an externally connected effector. A delay memory 270 is used by the incorporated DSP. A voice signal generated by the sound source 200 is converted by a DA converter 17 into an analog signal, which is sounded by a sound system (SS) 18 composed of an amplifier, a loudspeaker, and so on.

1-1. Sound Source

Figure 2:
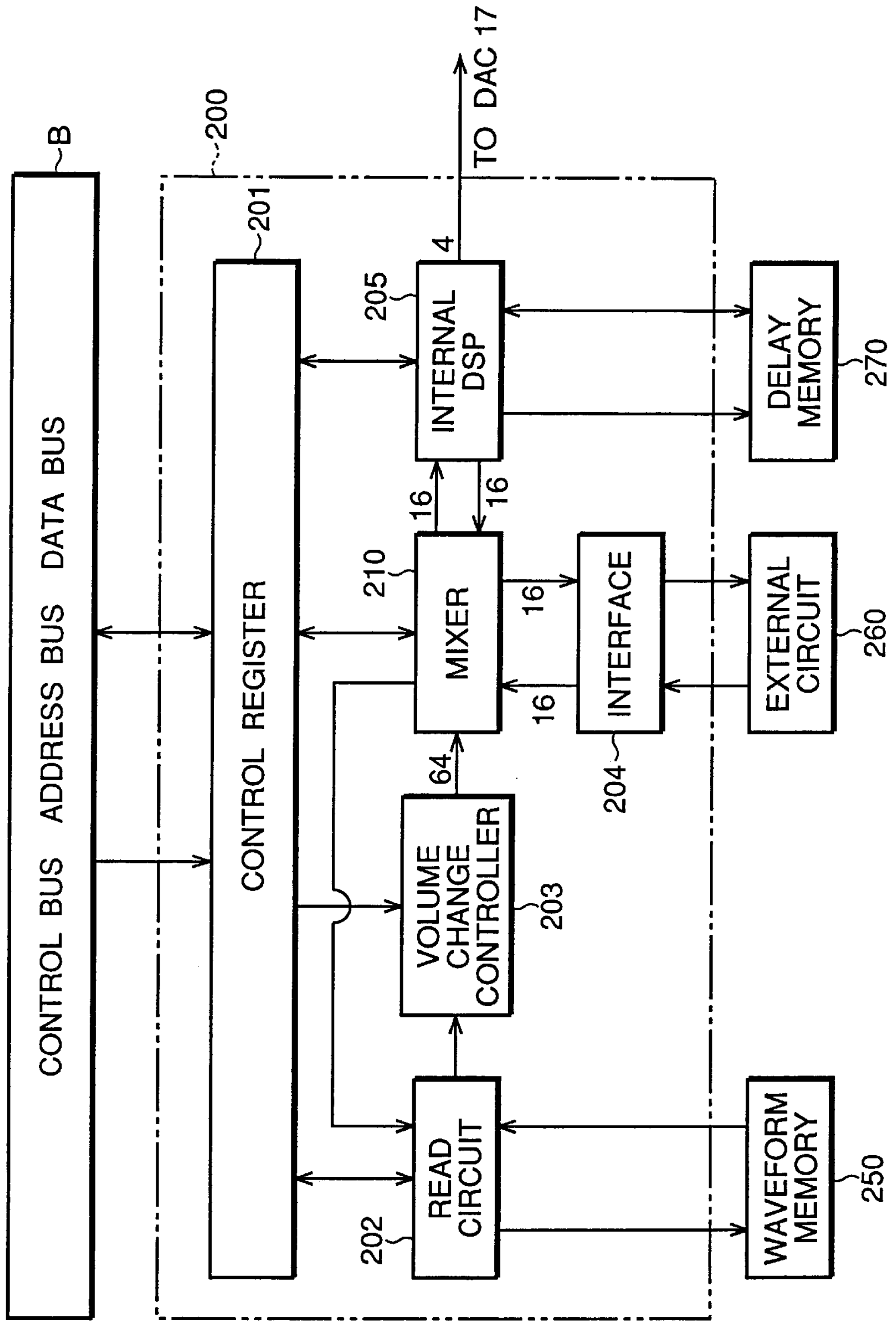
FIG. 2 is a block diagram illustrating constitution of a sound source for use in the above-mentioned embodiment.

The following describes constitution of the sound source with reference to FIG. 2. As shown in the figure, the sound source generally constitutes a main portion of the inventive mixing apparatus. In the mixing apparatus, a control register 201 is connected to the CPU 10 through the bus B to control other components of the sound source 200. A read circuit 202 reads waveform data of a specified timbre from the waveform memory 250 by operating memory addresses of the waveform memory 250 such that a pitch specified by key code KC is obtained. A volume change controller 203 controls the amplitude of waveform data read by the read circuit 202 such that the volume indicated by the key touch signal KT is obtained. The thus obtained waveform data provides internal input voice signals before effects are imparted. The read circuit 202 and the volume change controller 203 operate on a time-divided 64-channel basis, thereby constituting an internal tone generator for generating different voice signals through the different channels.

When a note-on event such as key pressing occurs, the CPU 10 assigns a corresponding note to one of the 64 channels, and writes music tone control data for controlling occurrence of a music tone corresponding to the note-on event to the control register 201 at the assigned channel area. Based on the written music tone control data, the read circuit 202 and the volume change controller 203 cooperate to generate the corresponding music tone. It should be noted here that the volume change controller 203 outputs the generated music tone through each channel directly to a mixer 210 in every sample period or frame period on a time-divided 64-channel basis.

The mixer 210 receives the voice signals from the volume change controller 203, other voice signals from the internal DSP 205, and external voice signals from the external circuit 260. The mixer 210 performs predetermined processing on these input voice signals, and outputs resultant mixed signals to the internal DSP 205 and the external circuit 260. Also, the mixer 210 returns a specific voice signal of a given channel to the read circuit 202. The read circuit 202 can write the returned voice signal to the RAM area of the waveform memory as new waveform data. Details of the mixer 210 will be described later with reference to FIG. 3. It should be noted that the numeral attached to each signal line in FIGS. 2 and 3 denotes the number of channels of voice signals to be transmitted by that signal line.

As described above, the internal DSP 205 imparts an effect to the voice signal. Four channels of the voice signals outputted from the DSP 205 are supplied to the DA converter 17 shown in FIG. 1 to provide the final output of this electronic musical instrument. This electronic musical instrument uses the internal DSP 205 as its final output stage in order to make the final output stage in the electronic musical instrument operate as an equalizer. This equalizer is one of the effect blocks constituted in the internal DSP 205.

1-2: Mixer

The following describes the mixer 210 in detail. For convenience of description, the processing to be executed in the mixer 210 will be described before the constitution thereof.

1-2-1: Internal Processing of the Mixer

Figure 5:
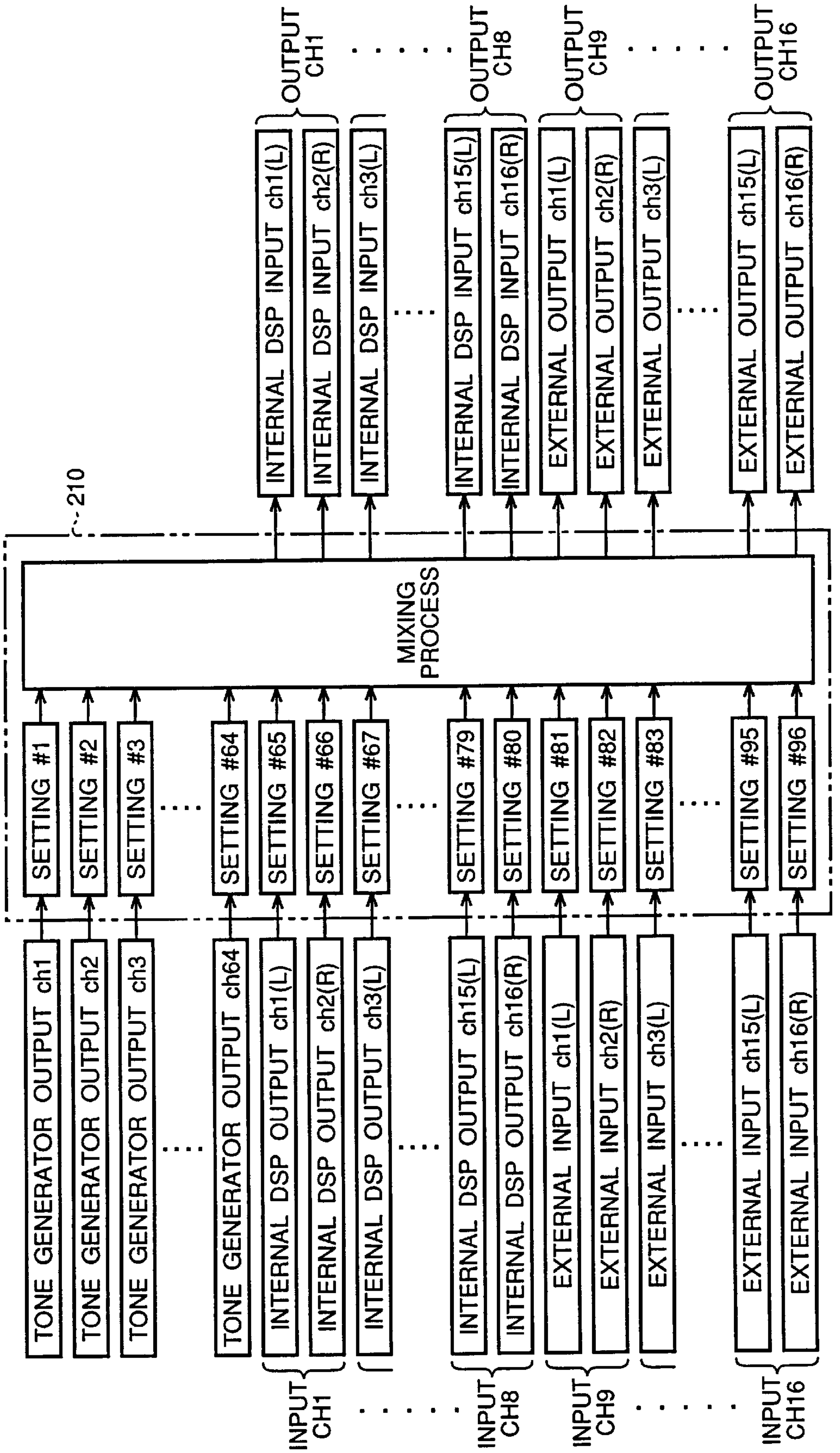
FIG. 5 is a block diagram describing input/output channels of the above-mentioned mixing apparatus.
Figure 8:
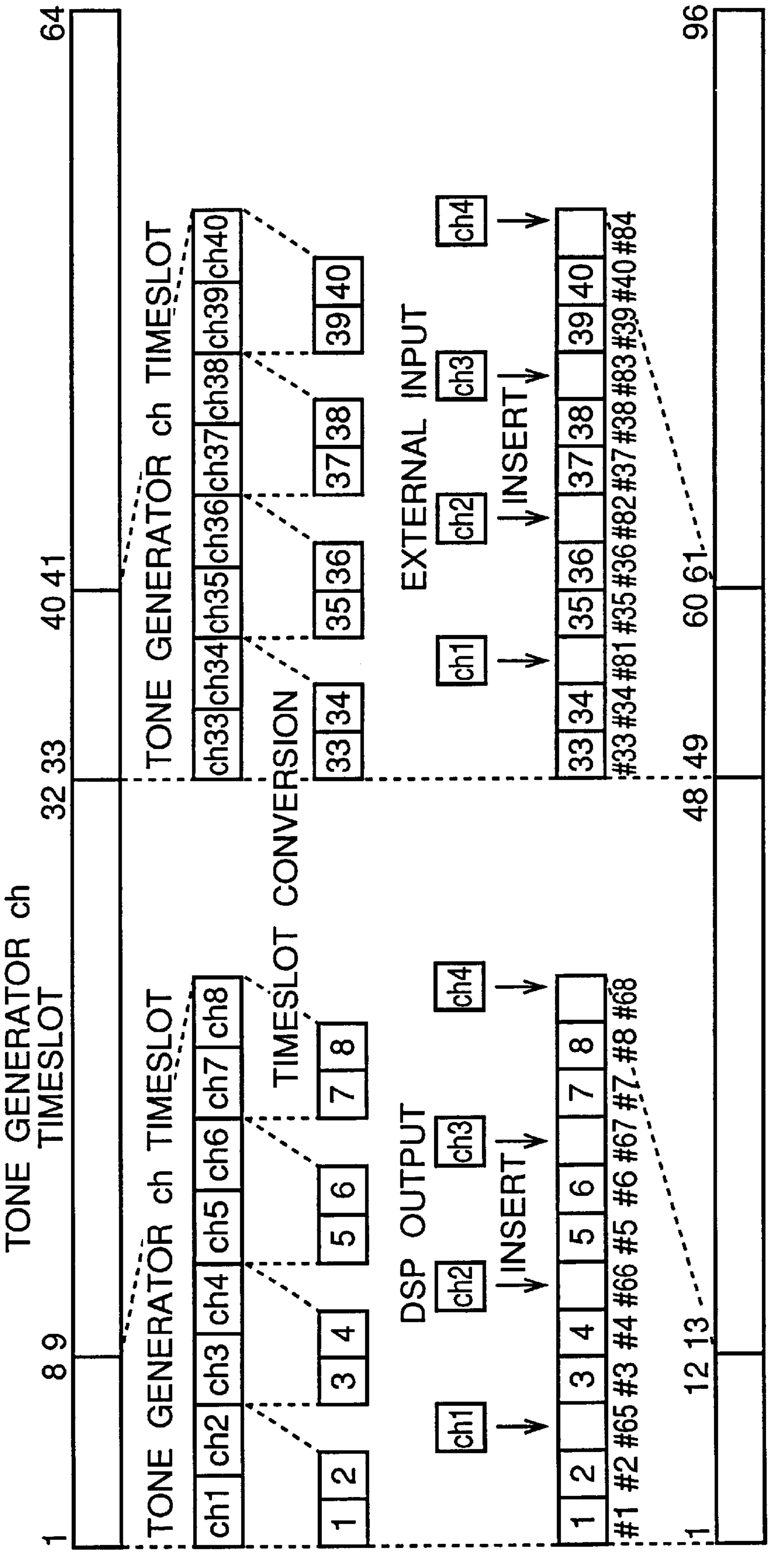
FIG. 8 is a timing chart describing a timeslot converting operation in the above-mentioned mixing apparatus.

As shown in FIG. 5, the mixer 210 receives a total of 96 channels of voice signals, 64 channels from the internal tone generator, 16 channels from the internal DSP, and 16 channels from the external circuit 260. Then, the mixer 210 performs multiplication determined by control information presented by setting #1 to setting #96 on the voice signal of each channel. Further, the mixer 210 assigns a total of 32 channels, 16 channels to the internal DSP 205 and 16 channels to the external circuit 260. The setting #1 to setting #96 are written by the CPU 10 to the control register 201. Setting #1 to setting #64 correspond to sound channel ch1 to sound channel ch64, respectively, of the internal tone generator. Setting #65 to setting #80 correspond to output channel ch1 to output channel ch16, respectively, of the DSP 205 to the mixer 210. Setting #81 to setting #96 correspond to external input channel ch1 to external input channel ch16, respectively. The processing to be executed according to each setting # will be described later. It should be noted that coefficient multiplication processing corresponding to the setting # is not executed sequentially in the order of setting numbers. For example, this processing is executed in the order of #1, #2, #65, #3, #4, #66, #5, . . . , #34, #81, #35, #36, #82, #37, . . . as shown in FIG. 8. Of the input/output channels of the internal DSP 205 and the external circuit 260, the odd-numbered channels are assigned to the stereo L (left) signal and the even-numbered channels are assigned to the stereo R (right) signal. Consequently, each of the internal DSP 205 and the external circuit 260 has stereo 8 channels (CHs) for the input/output thereof.

It should be noted that, for convenience of description, a monaural input/output channel is represented in lowercase "ch" while a stereo input/output channel is represented in uppercase "CH." Therefore, one stereo input/output channel (CH) consists of two monaural input/output channels (ch). When an input/output channel is represented as "CH" in stereo, the stereo channels to be supplied from the internal DSP 205 are represented in input CH1 to input CH8 as viewed from the mixer 210. The stereo channels inputted from the external circuit 260 are represented in input CH9 to input CH16 as viewed from the mixer 210. On the other hand, the stereo channels to be inputted in the internal DSP 205 from the mixer 210 are represented in output CH1 to output CH8 as viewed from the mixer 210. The stereo channels to be outputted to the external circuit 260 are represented in output CH9 to output channel CH16 as viewed from the mixer 210. For the inputs from the internal tone generator, the input channels are represented in monaural ch1 to ch64 (sound channels 1 to 64) because panning has not yet been executed on these inputs.

1-2-2: Setting #(i)

The following describes the processing to be determined by setting #1 to setting #96 with reference to FIGS. 6(*a*), 6(*b*), and 6(*c*). This processing is executed for each of the 96 channels to be inputted. The contents of the processing for a given input channel i (i being an integer 1 to 96) are determined by various pieces of control information of setting #i shown in FIG. 6(*a*). The information of each of setting #1 to setting #64 is set according to the timbre of a music tone or voice to be sounded by each sound channel. Namely, the music tone control data of each of the above-mentioned sound channels includes the information of setting #(i). For example, assume that separate performances are simultaneously made in piano timbre and guitar timbre. In this case, to each sound channel, the music tone control data corresponding to the timbre to be generated in that sound channel is set. Namely, a different setting #(i) is set according the timbre of a music tone assigned to that channel. On the other hand, the information of setting #65 to the information of setting #96 are separately set for each effect to be executed by the DSP 205 or for each external circuit 260 to be connected according to an operation made on the switch panel 13. The information or parameters of setting #(i) is composed of (1) pan information L and pan information R indicative of a weight of stereo L and R signals, (2) level information S1 to level information S4 for determining the send level of these L and R signals, and (3) assignment information A1 to assignment information A16 for determining how to assign the multiplication results determined by these pan information L and pan information R and level information S1 to level information S4 to each output channel. The assignment information A1 to the assignment information A16 correspond to the stereo output channels CH1 to CH16.

Figure 7:
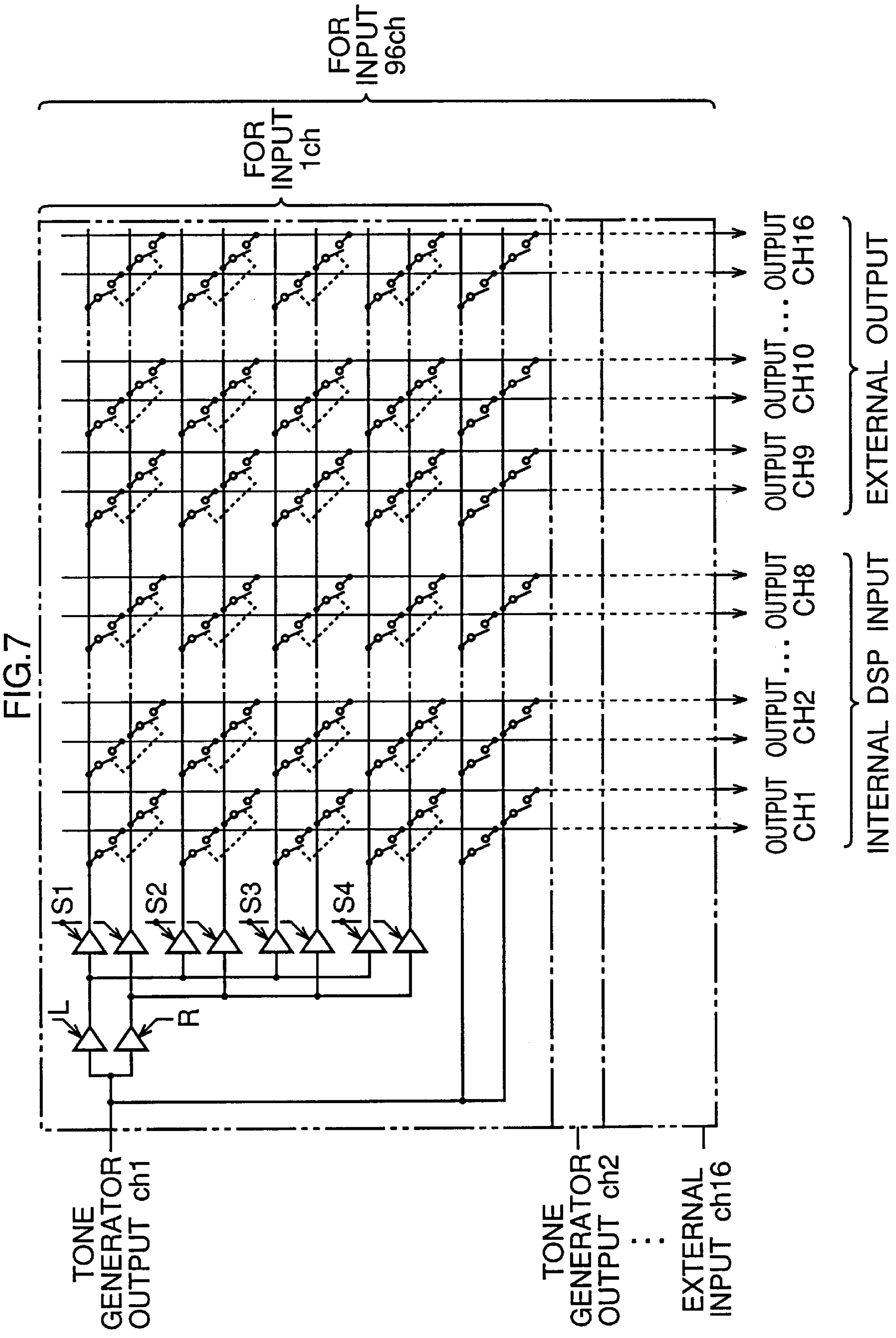
FIG. 7 is a diagram illustrating an equivalent circuit of mixing process in the above-mentioned mixing apparatus.

The following describes an equivalent circuit of the mixer 210 with reference to FIG. 7. In the circuit shown in this figure, as for each input channel, a total of 5 channels of stereo signals are obtained, these stereo signals being composed of those obtained by weighting the input voice signal according to the pan information L and R and then multiplying the weighted input voice signals by the level information S1 to level information S4, and those obtained by dividing the input voice signal into the L and R signals without multiplying that input voice signal by any multiplication coefficient. One of these 5 channels of stereo signals is selected for each of the output channels CH1 to CH16 by the assignment information. The similar processing is executed on all of the input voice signals of the 96 channels.

It should be noted that the parameters or coefficients of the pan information L and R and the level information S1 to S4 are represented in dB (decibel) unit. Then, 8 multiplication coefficients M1 to M8 can be represented in combinations for adding the pan information L and R to the level information S1 to S4 as shown in FIG. 6(*b*). The input channel voice signal is multiplied by the 8 multiplication coefficients M1 to M8 to produce eight number of different stereophonic variations. Each input voice signal is multiplied by the multiplication coefficients M1 to M8 represented as shown in FIG. 6(*b*) in a time division manner by constitution to be described later, so that the 8 multiplication results or variations can be obtained equivalently shown in FIG. 7.

The following describes the assignment information A1 to A16 included in the control information of setting #(i). The assignment information A1 to the assignment information A16 are set corresponding to the stereo output channels CH1 to CH16. The assignment information each consisting of 3 bits determines selective assignment of those variations obtained without multiplication of the coefficients and those obtained by multiplication by the coefficients to the stereo output channel CH concerned. In detail, the contents of assignment information A(j) for a given stereo output channel j (j being an integer of 1 to 16) are shown in FIG. 6(*c*). For example, if the assignment information A(10) of setting #(79) is "101," a result of multiplying the voice signal of the input ch79 by multiplication coefficient M3 is assigned to the L channel of the stereo output CH10, and another result of multiplying the voice signal of the input ch79 by multiplication coefficient M4 is assigned to the R channel of the same stereo output CH10. Namely, the result of multiplying the input voice signal from the L channel of th e stereo input CH8 (the output ch16 of the internal DSP 205) by multiplication coefficient M3 is assigned to the external output ch3 of the external circuit 260, and the other result of multiplying the same input voice signal by multiplication coefficient M4 is assigned to the external output ch4 of the external circuit 260.

1-2-3: Mixer Constitution

Figure 3:
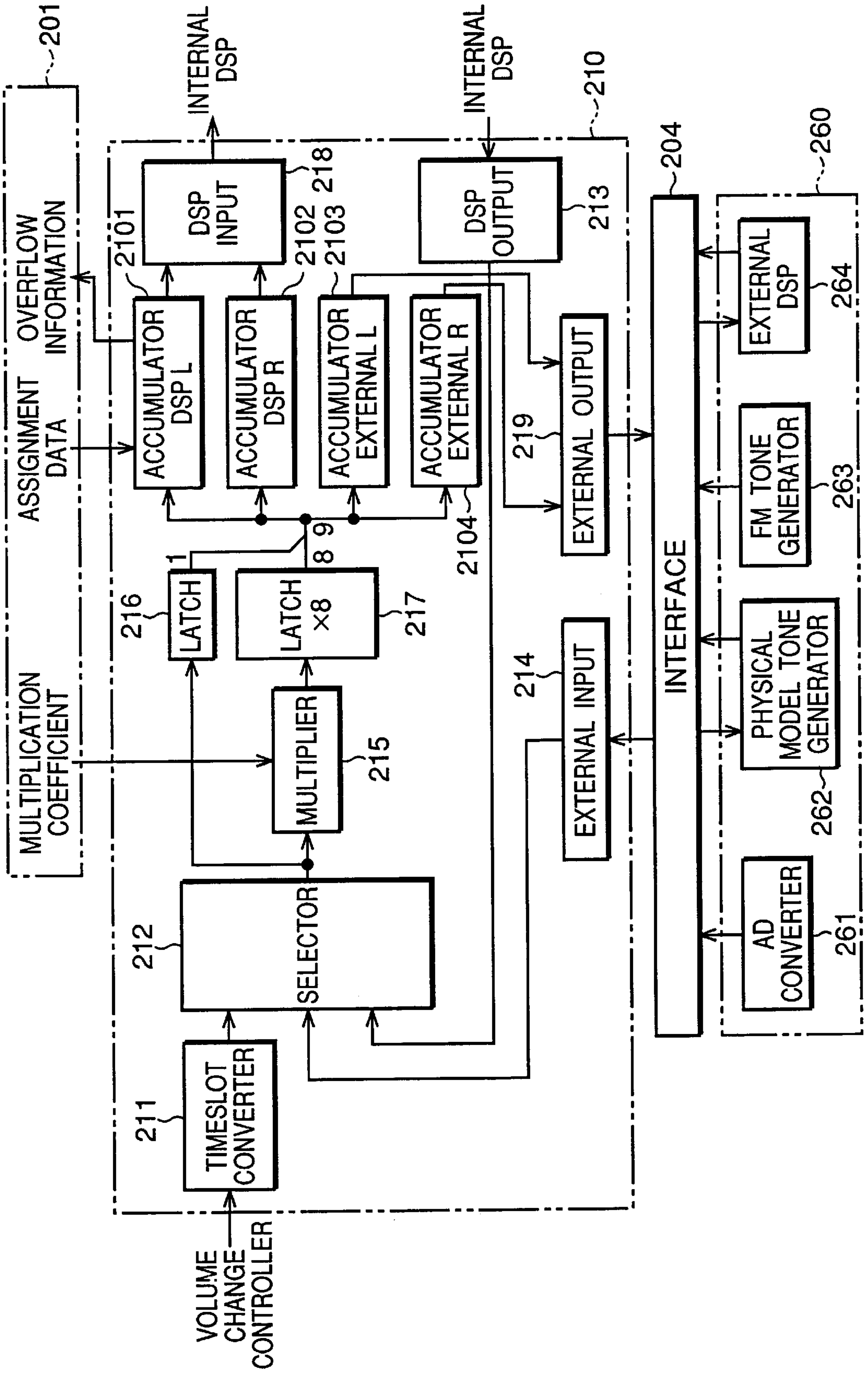
FIG. 3 is a block diagram illustrating constitution of a mixing apparatus for use in the above-mentioned sound source.

The following describes internal constitution of the mixer for executing the above-mentioned internal processing with reference to FIG. 3. In the figure, a timeslot converter 211 receives the input voice signals through the time-divided 64 channels from the internal tone generator as shown in a time chart of FIG. 8. The timeslot converter 211 compresses the width of each timeslot corresponding to each of the 64 channels by the ratio of 2/3. Therefore, in one sample period, 96 timeslots are created, which is 1.5 times the 64 channels. A selector 212 makes selection of the channels ch such that the total of 96 channels ch are distributed to the converted 96 timeslots in one to one correspondence. The total of 96 channels are composed of 64 channels of the internal tone generator, 16 channels from the internal DSP 205 supplied through a DSP output port 213, and 16 channels from the external circuit 260 supplied through an interface 204 and an external input port 214.

The external circuit 260 constitutes providing means for inputting a voice signal generated by another tone generator. The providing means may impart an effect to a voice signal. In the present embodiment, an AD converter 261 is selected as one o the above-mentioned providing means for converting an analog signal such as microphone input into a digital voice signal. The above-mentioned providing means further includes an FM tone generator 263. Moreover, for the above-mentioned providing means, the present embodiment assumes a physical model tone generator 262 for operating an electrical model obtained by simulating sound mechanism of an acoustic musical instrument to synthesize the music tone of the acoustic musical instrument, and an external DSP 264 for imparting an effect separately from the internal DSP 205. The physical model tone generator 262 synthesizes a music tone generated by a stringed instrument like a guitar for example. The tone generator 262 is composed of a nonlinear device simulating the elasticity characteristic of the string and a delay circuit providing a delay equivalent to the oscillation period of the string, both being connected in a closed loop. An effect simulating the physical characteristic of the guitar is imparted by inputting a voice signal generated by any one of the above-mentioned 64 sound channels as a kind of exciting signal into this closed loop (when viewed from the mixer 210, outputting the voice signal to the closed loop), and by taking a signal circulating the closed loop as an output signal (when viewed from the mixer 210, this is an input signal). In this case, an exciting waveform recorded with a picking pulse of the guitar is provisionally stored in the waveform memory 250. The above-mentioned exciting voice signal is generated in the above-mentioned sound channel when this exciting waveform data is read out from the waveform memory.

The voice signal treated by the mixer 210 is a multi-bit parallel signal and the signal provided from the external circuit 260 is a serial signal. Hence, the interface 204 has a parallel-to-serial converting capability of converting the parallel signal from the mixer 210 into the serial signal to the external circuit 260, and a serial-to-parallel converting capability of converting the serial signal from the external circuit 260 into the parallel signal to the mixer 210. This arrangement reduces the number of terminals of the sound source 200 (refer to FIG. 2) constituted by a single-chip integrated circuit. It should be noted that the external circuit 260 may be arranged on the main board of the electronic music instrument, on which the sound source 200 is mounted. Alternatively, the external circuit 260 may be connected to a connector arranged in the interface 204 of the main board. This arrangement can change the number of external circuits 260, thereby diversifying capabilities of the electronic musical instrument. The external circuit 260 may be optionally arranged on the main board, hence the grade of the electronic musical instrument can be changed according to the number of external circuits 260 connected. Namely, for a high-level application, the number of external circuits 260 or optional devices may be set to three or more; for a medium-level application, it may be set to one or two; and for a low-level application, the external circuit 260 may be omitted from the configuration. In case that the external circuit 260 is connected to the connector of the main board, two or more boards having external circuits 260 having different capabilities are prepared and selectively connected as required so as to change the grades of the electronic musical instrument.

Now, in each of eight timings or sub timeslots obtained by dividing one timeslot after the conversion, a multiplier 215 multiplies the voice signal of channel (n) outputted from the selector 212 in that timeslot by the multiplication coefficients M1 to M8 determined by the setting #(n) concerned. A latch circuit 216 latches the voice signal of the same channel as it is without the multiplying. A latch circuit group 217 latches the eight multiplication results. Next, accumulators 2101 to 2104 correspond to L and R of output CH1 to output CH8 and L and R of output CH9 to output CH16. In other words, the accumulator 2101 corresponds to the odd-numbered channels ch of internal DSP input channels ch1, ch3, ch5, ch7, ch9, ch11, ch13, and ch15 to be supplied to the internal DSP 205. The accumulator 2102 corresponds to the even-numbered channels ch of internal DSP input channels ch2, ch4, ch6, ch8, ch10, ch12, ch14, and ch16 to be supplied to the internal DSP 205. The accumulator 2103 corresponds to the odd-numbered channels ch of external output channels ch1, ch3, ch5, ch7, ch9, ch11, ch13, and ch15 to be supplied to the external circuit 260. The accumulator 2104 corresponds to the even-numbered channels ch of external output channels ch2, ch4, ch6, ch8, ch10, ch12, ch14, and ch16 to be supplied to the external circuit 260. The accumulators 2101 to 2104 concurrently execute processing for different output CH of the same channel in each timeslot.

1-2-4: Accumulator Constitution in the Mixer

Figure 4:
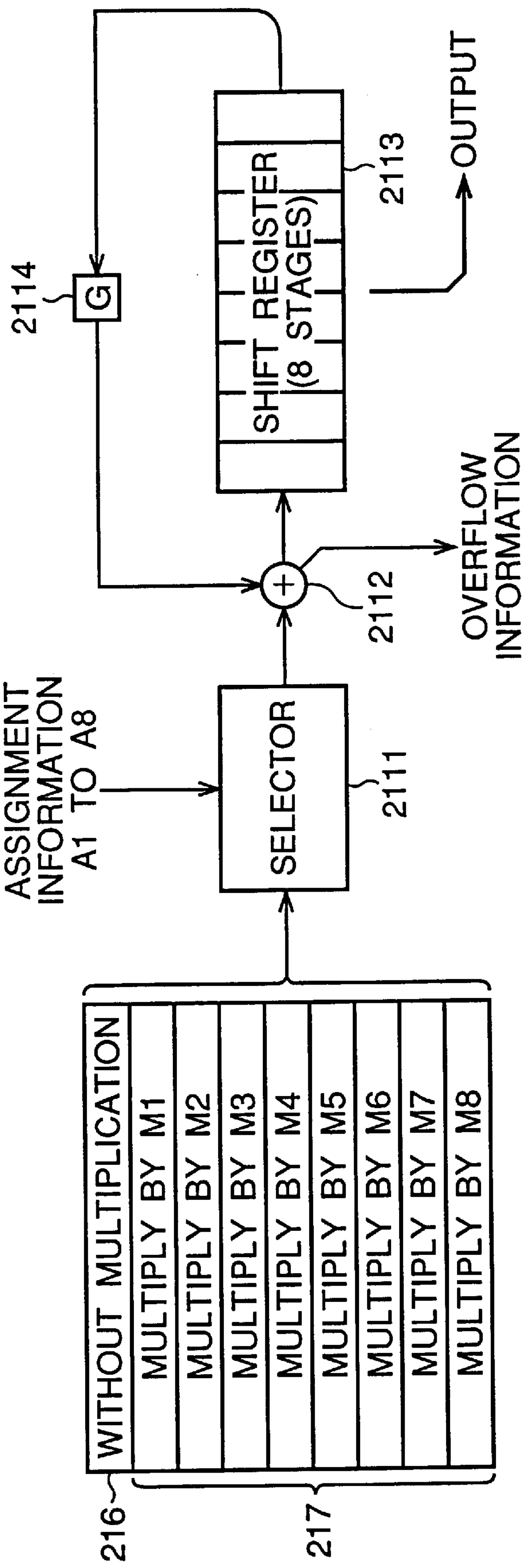
FIG. 4 is a block diagram illustrating constitution of an accumulator for use in the above-mentioned mixing apparatus.

The following describes constitution of the accumulators 2101 to 2104. The accumulator 2101 is exemplified with reference to FIG. 4. The latch circuit 216 and the latch circuit group 217 latch a total of 9 computation results for one timeslot as described above. The computation results includes those obtained without performing multiplication on the voice signal and those obtained by multiplying the same voice signal by multiplication coefficients M1 to M8. A selector 2111 sequentially selects the multiplication results according to the assignment information A1 to A8 of setting #(n) with the same timing as the timing of the multiplication by the multiplier 215, namely the timing obtained by dividing one timeslot by 8. The selector 2111 supplies the selection results to one input terminal of an adder 2112. A shift register 2113 sequentially shifts the results of the addition by the adder 2112 in synchronization with the selection timing of the selector 2111. The number of shift stages is 8 corresponding to the L channels (ch1, ch3, ch5, ch7, ch9, ch11, ch13, and ch15) of output channels (CH1 to CH8). The addition results outputted from the shift register 2113 are sequentially supplied to the other input terminal of the adder 2112 through a gate circuit 2114.

The gate circuit 2114 closes only in the first of 96 timeslots in one sample period in order to prevent the addition result corresponding to the last sample period from being supplied to the other input terminal of the adder 2112. Consequently, the adder 2112 accumulates 96 timeslots of data in one sample period. The final output of the accumulator 2101 is provided at the last of the 96 timeslots in one sample period as the data set to each stage of the shift register 2113 after the computation result determined by the assignment information A8 is selected by the selector 2111. The final data accumulated in each stage of the shift register 2113 is supplied to the internal DSP 205 (refer to FIG. 2) through the DSP input port 218 (refer to FIG. 3) as the L part of the output channels H1 to H8 of the mixer 210 in one sample period.

It should be noted that, in the accumulation in one sample period, any of the output channels may cause an overflow. Therefore, the adder 2112 outputs, as overflow information, a flag that is set to "1" when an overflow occurs. Determination of a sub timeslot at which the overflow flag has been turned "1" can indicate the output channel in which the overflow has taken place. The constitutions of the accumulators 2102 to 2104 are the same as that of the accumulator 2101. However, the accumulators 2103 and 2104 process the output channels CH9 to CH16, so that the assignment information A9 to A16 are supplied to the selector 2111. The output of the selector 2111 is supplied to the external circuit 260 through the external output port 219 and the interface 204 (refer to FIG. 3).

As described above, in one aspect of the invention, the inventive sound mixing apparatus is constructed for synthesizing M=32 channels of output voice signals from m=96 channels of input voice signals. In the apparatus, first providing means is composed of the read circuit 202 and the volume control circuit 203 to constitute an internal tone generator for providing n=64 channels of input voice signals at a frame period that is arranged with n number of timeslots to accommodate the n=64 channels of the input voice signals. Rearranging means is composed of the timeslot converter 211 for rearranging the timeslots so as to increase the number of the timeslots from n to m within the frame period, and for distributing the n=64 channels of the input voice signals to the rearranged timeslots so as to create m-n=32 number of free timeslots within the frame period. The second providing means is disposed in the form of the external circuit 260 separately from the first providing means for providing at most m-n=32 channels of input voice signals in addition to the n=64 channels of the input voice signals. Allocating means is composed of the selector 212 for allocating at most the m-n=32 channels of the input voice signals to the mn=32 number of the free timeslots so as to accommodate within the frame period the m=96 channels of the input voice signals provided from both of the first providing means and the second providing means. Mixing means is composed of the multiplier 215, the latches 216 and 217, and the accumulators 2101 to 2104 for mixing the m=96 channels of the input voice signals with one another to produce the M=32 channels of the output voice signals.

Preferably, the sound mixing apparatus further includes setting means in the form of the control register 201 for setting control information to each of the m=96 channels of the input voice signals. The control information setting# contains a pair of pan parameters L and R effective to stereophonically locate each input voice signal, k=4 number of level parameters S1–S4 effective to determine different volumes of each input voice signal, and M/2 number of assignment parameters A1–A16 effective to assign each input voice signal to M/2 number of stereo channels comprised of the M=32 channels of the output voice signals. In such a case, the mixing means multiplies each input voice signal by 2k=8 number of coefficients M1–M8 derived from combination of the pair of the pan parameters and the k=4 number of the level parameters to produce 2k=8 number of variations of each input voice signal, and then selectively assigns the 2k=8 number of the variations to each of the M/2 number of the stereo channels according to each of the M/2 number of the assignment parameters A1–A16.

Preferably, the mixing means successively accumulates the m=96 channels of the input voice signals throughout the frame period for each of the M=32 channels to produce the output voice signals. In such a case, detecting means is provided in the form of the adder 2112 for detecting when overflow occurs at one or more of the M=32 channels during successive accumulation of the input voice signals in order to remove the overflow.

Preferably, the sound mixing apparatus has the setting means in the form of the control register 201 as described before for setting control information setting# to each of the m=96 channels of the input voice signals. The control information setting# is compatible to all of the input voice signals. In such a case, the mixing means mixes the m=96 channels of the input voice signals with one another to produce the M=32 channels of the output voice signals according to the control information setting# so that the m-n=32 number of the input voice signals provided by the second providing means can be treated by the mixing means equivalently to the n number of the input voice signals provided by the first providing means.

According to another aspect of the invention, the inventive integrated circuit device is used in music application. In the integrated circuit device, a tone generator section is composed of the read circuit 202 and the volume change controller 203 for internally generating music tone signals through a plurality of time-divisional channels. An input section is composed of the interface 204 for receiving music tone signals that are externally inputted from the external circuit 260. A processor section is composed of the internal DSP 205 for modifying waveforms of the music tone signals either being generated by the tone generator or being received by the input section. A register section is composed of the control register 201 for registering control information setting# compatible to all of the music tone signals being generated by the tone generator, being received by the input section and being modified by the processor section. A mixer section is composed of the multiplier 215, the latches 216 and 217, and the accumulators 2101 to 2104 for mixing the music tone signals with one another according to the control information setting# such that the mixer section can equivalently treat all of the music tone signals being generated by the tone generator, being received by the input section and being modified by the processor section. An output section is composed of the ports 218 and 219 for externally transmitting the music tone signals mixed by the mixer section.

According to a further aspect of the invention, the mixing apparatus is constructed for mixing input voice signals with each other to produce output voice signals. In the inventive mixing apparatus, a generator is composed of the read circuit 202 and the volume change controller 203 that has a predetermined number of internal channels for internally generating the predetermined number of input voice signals at each sample period divided into the predetermined number of timeslots to accommodate the predetermined number of the input voice signals within each sample period. The converter 211 converts division of the sample period so as to increase a total number of the timeslots within each sample period, and distributes the predetermined number of the input voice signals to the increased number of the timeslots so as to create an extra number of free timeslots within each sample period. The interface 204 can receive the extra number of input voice signals provided from the extra number of external channels of an external signal source disposed in the form of the external circuit 260 separately from the generator. The selector 212 allocates the extra number of the input voice signals to the extra number of the free timeslots so as to accommodate within each sample period the total number of the input voices signals provided concurrently from both of the generator and the interface. A processor is composed of the multiplier 215, the latches 216 and 217, and the accumulators 2101 to 2104 for mixing the total number of the input voice signals with one another to produce the output voice signals.

Preferably, the processor weights the input voice signals, pans the input voice signals and accumulates the input voice signals to produce each of stereophonic output voice signals. Each of the accumulators 2101 through 2104 in the processor successively accumulates the total number of the input voice signals throughout the sample period so as to produce each of the output voice signals. In such a case, a detector is provided in the adder 2112 for detecting when overflow occurs during successive accumulation of the input voice signals in order to save the output voice signal from the overflow.

Preferably, in the inventive mixing apparatus, the control register 201 provides setting control information setting# to each of the input voice signals. The control information setting# is compatible to all of the input voice signals without discrimination between the internally generated input voice signals and the externally provided input voice signals. The processor mixes all of the input voice signals with one another to produce each of the output voice signals according to the control information setting# so that the extra number of the input voice signals provided by the external signal source can be treated by the processor equivalently to the predetermined number of the input voice signals generated internally by the generator.

Preferably, the interface 204 is connectable to the external signal source composed of an optional device selected from the external tone generator 262 or 263 for generating an input voice signal, the analog-to-digital converter 261 for converting an input voice signal from analog to digital, and the digital signal processor 264 for digitally processing an input voice signal.

Figure 10:
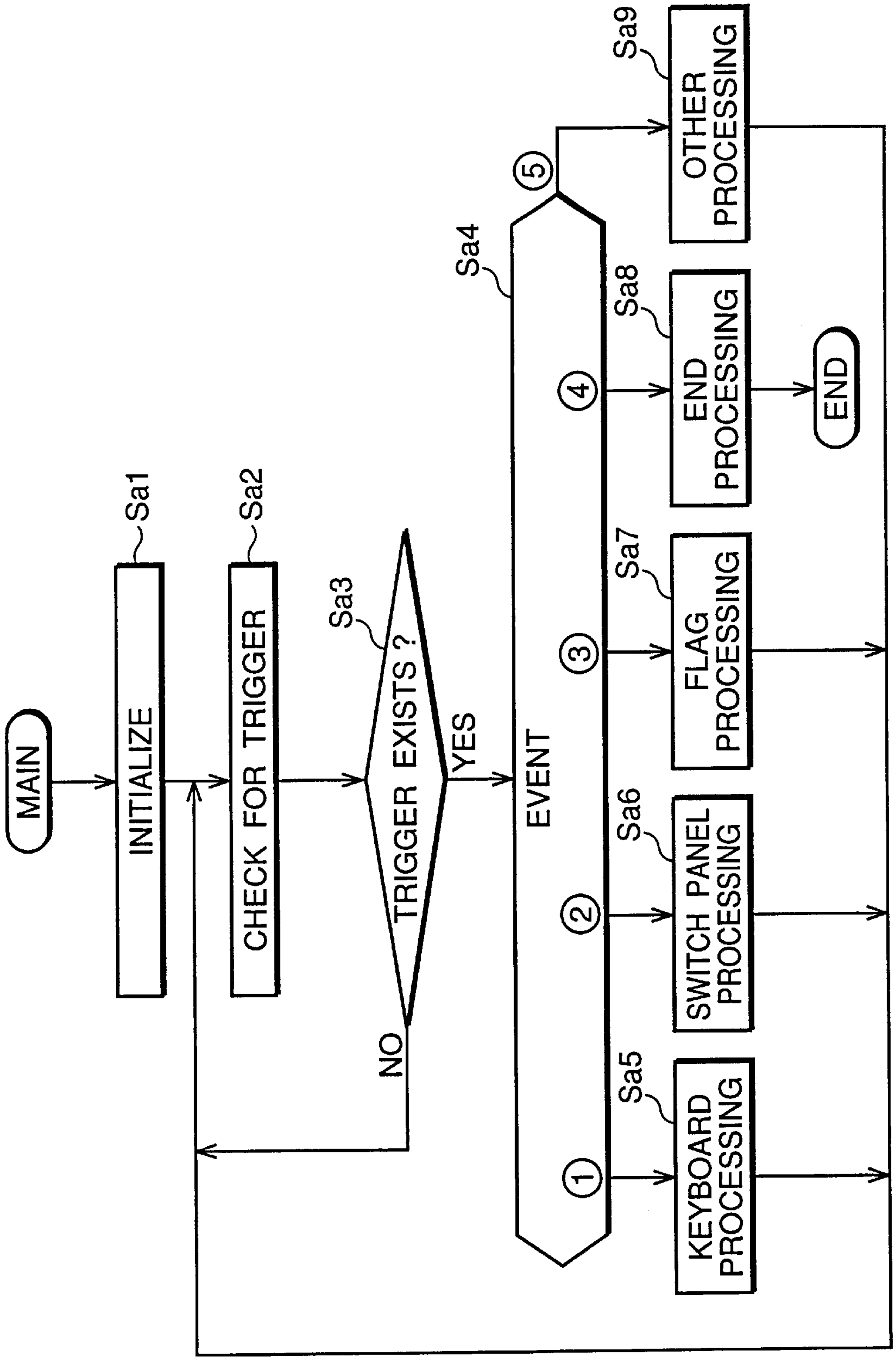
FIG. 10 is a flowchart indicative of overall operation of the above-mentioned electronic musical instrument.

The following describes operation of the above-mentioned electronic musical instrument. FIG. 10 is a flowchart indicative of main operation of the electronic musical instrument. First, when the electronic musical instrument is powered on, the CPU 10 executes initialization process in step Sa1. In this initialization process, the RAM 12 is reset, the setting state stored in the external storage device 16 in the last processing is read to use this setting state for the current processing. Next, the CPU 10 checks for a trigger in step Sa2. The trigger is caused by any one of the following events:

(1) a state of the keyboard 15 has changed (the same as the occurrence of an event in MIDI);

(2) a setting state of the switch panel 13 has changed;

(3) a predetermined time interval has been reached;

(4) the power switch has been turned off; and (5) other events.

For the status changes of (1), (2), and (4), the CPU 10 sequentially checks the state of each corresponding portion, and stores the check results into the RAM 12. Then, the CPU 10 reads the state of each portion stored in the last check, and compares it with the result of the current check. If a change is found between these checking operations, it indicates that a status change has taken place. The event of (3) can be caused by the system clock. If no trigger is found in step Sa3, the CPU 10 returns to step Sa2, and waits for a trigger to occur. On the other hand, if a trigger is found, the CPU 10 determines in step Sa4 as to which of the events (1) to (5) causes the trigger.

2-1: Keyboard Processing

If the trigger is caused by the event (1), the CPU 10 executes keyboard processing in step Sa5. The keyboard processing includes pressed-key processing and released-key processing. In the pressed-key processing, the CPU 10 transfers key-on information KON caused by the key pressing to the sound source 200. At the same time, in order to execute sounding of a note associated with this key pressing, the CPU 10 assigns one of the 64 sound channels that is free to this key pressing. If the sound channels of the sound source 200 are all busy, the CPU 10 turns off the music tone of a channel in which the sounding has progressed most or a channel in which the sounding has started early and the volume is smallest, to thereby forcefully provide a free channel. This free channel is assigned to the sounding associated with the key pressing. Then, the CPU 10 writes music tone control data corresponding to the specified timbre and corresponding to the key code KON and key touch KT indicated by the above-mentioned key-on information to the memory area of the control register 201 corresponding to the assigned sound channel.

In the sound source 200, the read circuit 202 reads out the waveform data of the specified timbre from the waveform memory 250 based on this music tone control data set to the control register 201 by operating the address of the waveform memory 250 such that the pitch specified by the key code KC accompanying this key-on signal KON is obtained. Also based on the music tone control data set to the control register 201, the volume change controller 203 controls the envelope of this waveform such that the volume specified by the key touch KT is obtained. Thus, the voice signal corresponding to this key pressing begins to be generated. The generated voice signal is supplied to the mixer 210. It should be noted that, as described above, the music tone control data of the sound channel includes setting #1 to setting #64 of the mixer 210. At the beginning of the sounding, the setting #(n) for the sound channel n is set.

On the other hand, in the key-releasing process, the CPU 10 transfers the key-off information KOFF caused by this key-releasing to the sound source 200. In the sound source 200, the read circuit 202 searches the 64 sound channels for one that is generating the music tone corresponding to the released key. If that channel is found, the read circuit 202 stops the reading of the waveform data being executed by the key-on KON corresponding to this key-off KOFF for this sound channel, thereby ending the generation of the voice signal. It should be noted that, after the above-mentioned keyboard processing, the CPU 10 returns to step Sa2 to check another trigger.

2-1-1: Mixing Operation

The following describes mixing operation to be executed when a music tone is supplied to the mixer 210. First, the voice signals of 64 channels are processed such that the amplitudes thereof have been controlled by the volume change controller 203 (refer to FIG. 2) so that the volume specified by the key-touch KT signal is obtained. Thereafter, the voice signals are inputted in the timeslot converter 211 (refer to FIG. 3) of the mixer 210. The timeslot converter 211 compresses a width of the timeslot corresponding to each of the 64 internal channels to 2/3 with the start point of each odd-numbered slot left unchanged. This conversion creates one free slot next to each even-numbered slot, amounting to a total of 32 free slots as shown in FIG. 8. The selector 212 selects internal DSP outputs ch1 to ch16 coming from the internal DSP 205 and external inputs ch1 to ch16 coming from the external circuit 260. The selector 212 sequentially assigns these additional channels to these free slots. Thus, a total of 96 channels including the 64 internal channels, the 16 channels outputted from the internal DSP 205, and the 16 external channels inputted from the external circuit 260 are assigned, respectively, to the 96 timeslots obtained by compressing the 64 timeslots.

Figure 9:
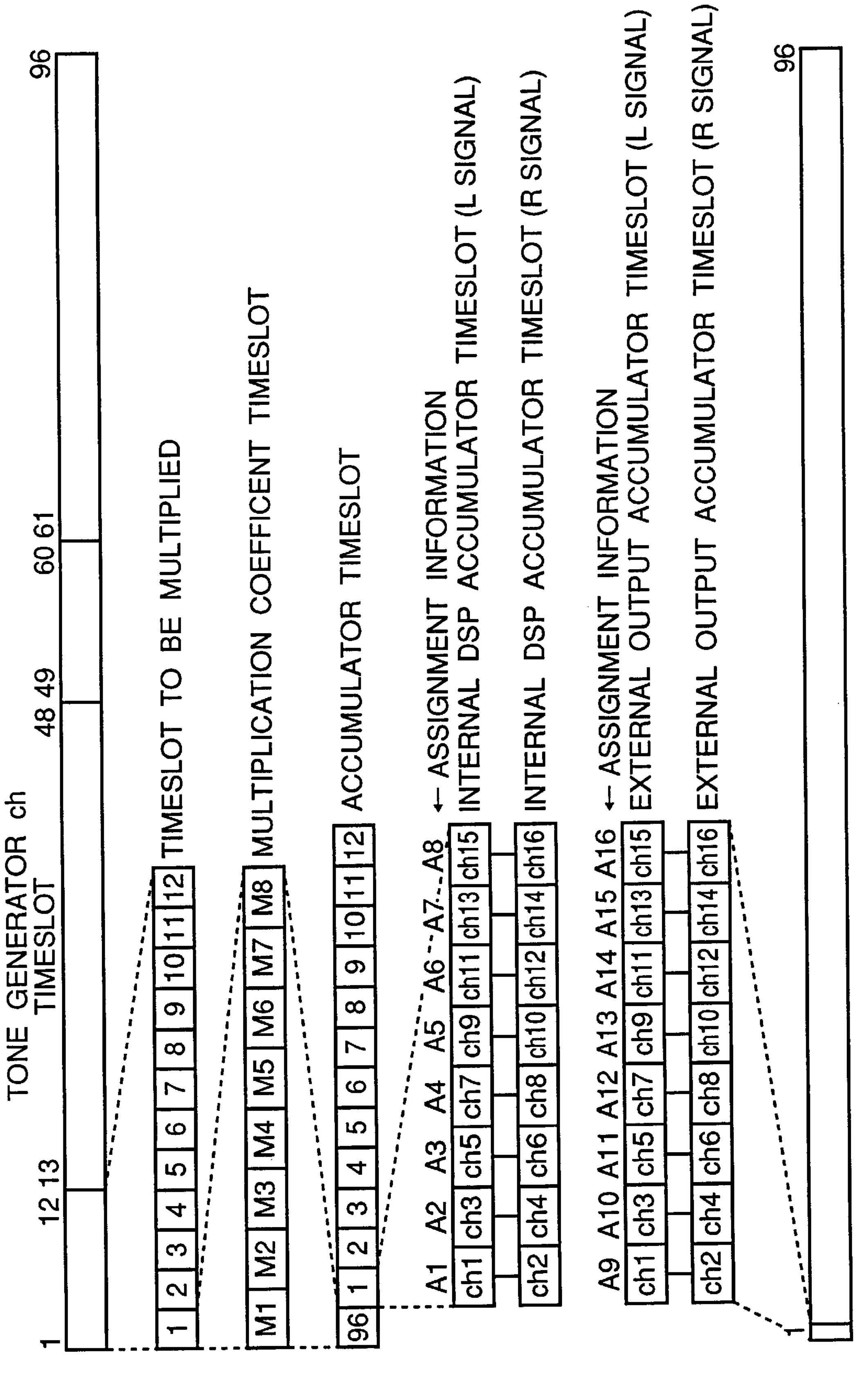
FIG. 9 is a timing chart describing a mixing operation in the above-mentioned mixing apparatus.

Next, the multiplier 215 (refer to FIG. 3) operates in each timing obtained by dividing one timeslot by 8 to sequentially multiply the voice signal of the channel assigned to the timeslot by the multiplication coefficients M1 to M8 determined by the setting#(n) assigned to that timeslot as shown in FIG. 9. Then, the latch circuit group 217 (refer to FIG. 3) latches the 8 multiplication results, and the latch circuit 216 latches that voice signal as it is. Therefore, the latch circuit group 217 and the latch circuit 216 latch a total of 9 computation results including those obtained by multiplying and not multiplying the voice signal by the multiplication coefficients M1 to M8 for one input channel in one timeslot. Therefore, for one input channel ch, the computation results before selection by the equivalent circuit shown in FIG. 7 are obtained. It should be noted here that, due to the latching operations by the latch circuit group 217 and the latch circuit 216, the accumulation processing is shifted to the next timeslot for execution.

In the next timeslot, the selector 211 (refer to FIG. 4) of the accumulator 2101 sequentially receives assignment information A1 to A8 of the setting#(n) corresponding to the channel concerned in the same timing as that of the multiplication by multiplier 215, obtained by dividing one timeslot by 8. Therefore, the selector 2111 selects, in the first timing, the computation result to be assigned to the L side of the output channel CH1 by the assignment information A1. The result of this selection is added by the adder 2112 to the content of the shift register 2113. If the timeslot associated with this processing is the first one in one sample period, nothing is added to the selection result because the gate circuit 2114 is closed.

In the second timing, the selector 2111 selects the computation result to be assigned to the L side of the output channel CH2 by the assignment information A2. On the other hand, the shift register 2113 shifts the stored contents by one stage. Subsequently, the above-mentioned operation is repeated up to the eighth timing to sequentially store the selection results assigned to the L side of the output channels CH1 to CH8 into the shift register 2113.

Next, when the processing goes to next timeslot, the shift register 2113 outputs, in the first timing of this timeslot, the result of the selection made in the first timing of the preceding timeslot. This output is fed back to the other input terminal of the adder 2112 through the gate circuit 2114. Consequently, the data of the L side of the output channel CH1 in the last timeslot is accumulated to the data of the L side of the output channel CH1 in the current timeslot. This holds true for the second to eighth timings. Therefore, in the current timeslot, the shift register 2113 stores the result obtained by accumulating, in each channel, each piece of data of the L side of the output channels CH1 to CH8 in the last timeslot. This operation is executed for each of the 96 timeslots included in one sample period. When this operation has been executed for all of 96 timeslots, each stage of the shift register 2113 of the accumulator 2101 stores each accumulation result of the L side of the output channels CH1 to CH8 in that sample period. Therefore, this accumulation result is supplied to the internal DSP 205 through the DSP input port 218 as each output of the L side of the output channels CH1 to CH8 in that sample period.

The accumulator 2102 also operates in generally the same manner as the accumulator 2101. Namely, each accumulation result of the R side or part of the output channels CH1 to CH8 in each sample period is supplied to the internal DSP 205 through the DSP input port 218. The accumulator 2103 also operates in generally the same manner as the accumulators 2101 and 2102. However, in the first timing to the eighth timing in each timeslot, the computation results are assigned to the L part of the output channels CH9 to CH16 according to the assignment information A9 to A16. Each of these computation results is supplied to the external circuit 260 through the external output port 219 and the interface 204. The accumulator 2104 also operates in generally the same manner as the accumulator 2103. Each computation result of the R part of the output channels CH9 to CH16 in each sample period is supplied to the external circuit 260 through the external output port 219 and the interface 204.

Then, the voice signals of the output channels CH1 through CH8 supplied to the internal DSP 205 through the DSP input port 218 are imparted with a predetermined effect. Some of these output channels are fed back to the mixer 210 through the DSP output port 213 while others are sounded through the DA converter 17 and the sound system 18. On the other hand, the voice signals of the output channels CH9 through CH16 supplied to the external circuit 260 through the external output port 219 and the interface 204 are imparted with a predetermined effect, and are then fed back to the mixer 210 through the interface 204 and the external input port 214.

Thus, the above-mentioned mixing operations equivalently execute the circuit shown in FIG. 7. It should be noted that, if a voice signal is inputted from the A/D converter 261 or the FM tone generator 263, some of the input channels CH9 to CH16 are assigned for inputting this voice signal. It is not always necessary for all of the output channels CH9 to CH16 to be outputted from the mixer 210 to the external circuit 260; only some of them may be outputted as required.

2-2: Switch Panel Processing

The following describes switch panel processing with reference to the flowchart shown in FIG. 10 again. If the trigger is caused by the event (2) in step Sa4, the CPU 10 executes the switch panel processing in step Sa6. Namely, the CPU 10 recognizes the setting state of the switch panel 13 and changes the current state to the recognized settings. The switch panel has a timbre select switch, a timbre edit switch, an effect select switch, an effect edit switch, a mixer control switch, and so on. According to the operations of these switches, the switch panel specifies performance timbres, edits the same, selects or set plural effects to be concurrently created by the internal DSP 205, and sets levels of input/output voice signals of the external circuit 260. When this switch panel processing is completed, the CPU 10 returns to step Sa2 for trigger checking.

2-3: Flag Processing

Figure 11:
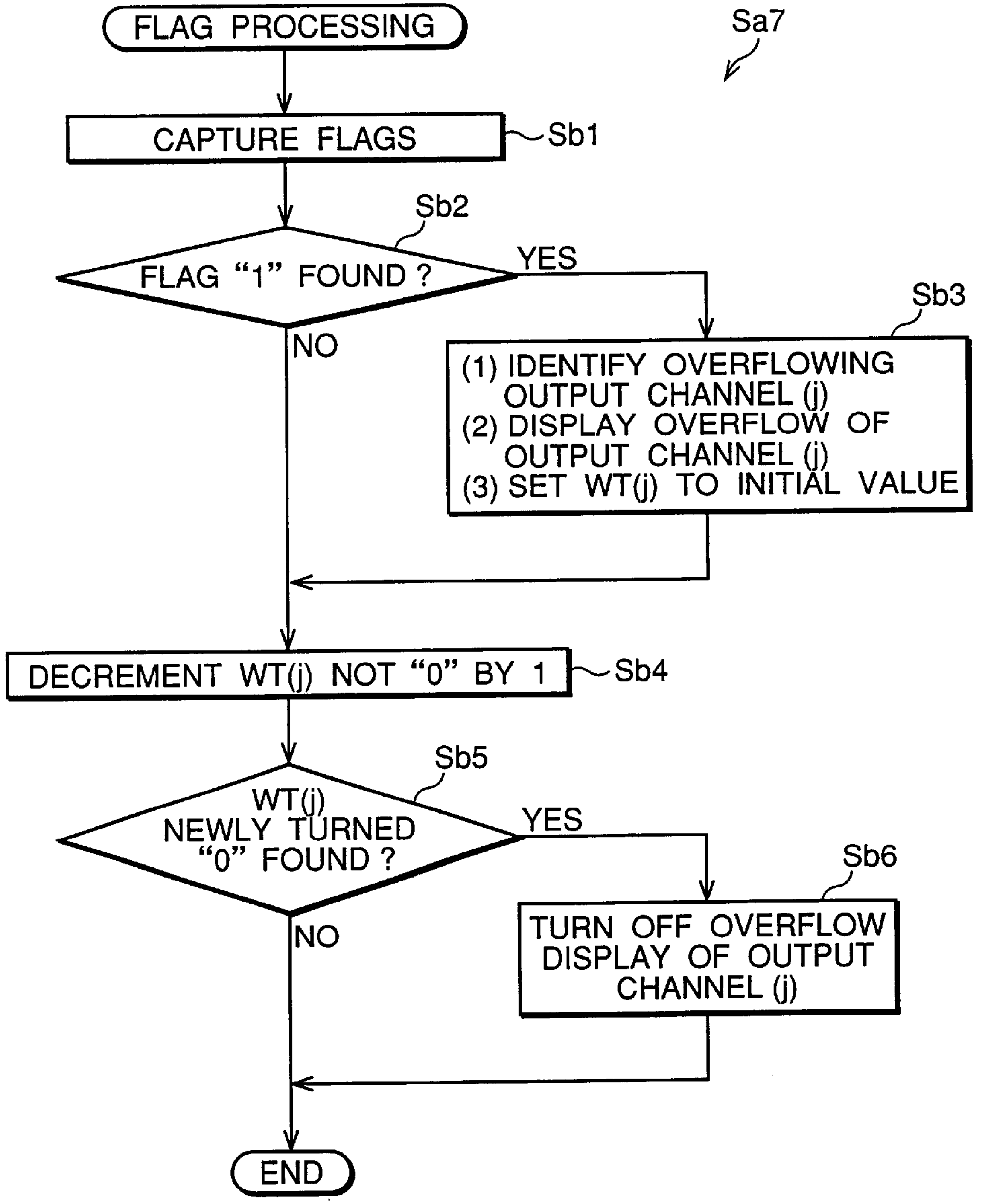
FIG. 11 is a flowchart indicative of flag process of the above-mentioned electronic musical instrument.

If the trigger is caused by the event (3) in step Sa4, the CPU 10 executes the flag processing in step Sa7 as shown in FIG. 11. This flag processing is executed at a certain time interval in each of sub timeslots obtained by dividing one timeslot by 8. The flag processing determines whether an overflow is caused in an output channel at each timing of the sub timeslots. If an overflow is detected, the flag processing informs the user of the detection of the overflow by displaying the fact on the display 14. To be more specific, in step Sb1, the CPU 10 captures the overflow information outputted from each adder of the accumulators 2101 to 2104. Next, based on the captured overflow information, the CPU 10 determines in step Sb2 whether there is an overflow in any of the accumulators. If the decision is YES, the CPU 10 first identifies in step Sb3 the overflowing output channel (j) based on the identification of the accumulator that has outputted this overflow information and based on the identification of the sub timeslot that has triggered this flag processing. For example, if the overflow information is outputted from the accumulator 2103 and the sub timeslot that has triggered this flag processing is the second one in the timeslot, the overflowing output channel is identified to the L part of the output channel CH10 (namely, the external output channel ch3 to the external circuit 260). Secondly, the CPU 10 displays the occurrence of the overflow on the output channel ch(j) onto the display 14 (refer to FIG. 1), thereby indicating the user to lower the level setting of the input channels assigned to this output channel ch(j). Thirdly, the CPU 10 sets an initial value p to a register WT(j) provided for this output channel ch(j). It should be noted here that, for convenience of description, the external output channels ch1 to ch16 to the external circuit 260 are regarded as output channels ch17 to ch32, which are continuation from the internal DSP input channels ch1 to ch16 to be supplied to the internal DSP 205. Therefore, WT1 to WT32 correspond to the output channels ch1 to ch32 as registers WT(j). On the other hand, if the decision in step Sb2 is NO, the CPU 10 does not execute the processing of step Sb3 and goes to step Sb4.

Next, in step Sb4, the CPU 10 decrements any of the registers WT1 to WT32 that is not "0." Namely, the initial value p set to register WT(j) is decremented by 1 every time this flag processing is called. Then, in step Sb5, the CPU 10 determines whether there is any of the registers WT1 to WT32 that is not "0" after the decrement. If the decision is YES, then in step Sb6, the CPU 10 turns off the indication of overflow of the output channel ch(j) corresponding to that register WT(j). Thus, when the flag processing is repeatedly called by the number of times set in the initial value p from the time at which no overflow is caused, the overflow indication of the output channel ch(j) is turned off. Stated otherwise, the initial value p denotes the number of times the flag processing is called to indicate how long the overflow indication is to be continued for the purpose of warning. If the decision in step Sb5 is NO, the CPU 10 ends this flag processing. Alternatively, when the processing in step Sb6 ends, the CPU 10 finishes this flag processing.

Therefore, the flag processing as described above allows the user to recognize an overflowing output channel and to take actions against this overflow by lowering the level of any of the input channels assigned to the overflowing output channel. It should be noted here that, in the present embodiment, the overflowing output channel is simply displayed on the display 14. If required, the input gain in the overflowing output channel may be automatically regulated by the CPU 10, thereby automatically taking actions against the overflow.

2-4: End Processing

Now, back to the flowchart shown in FIG. 10, if the trigger is caused by the event (4) in step Sa4, the CPU 10 executes the end processing such as saving the setting states into the external storage device 16 in step Sa8, and then actually powers off the electronic musical instrument, upon which the series of the operations comes to an end.

2-5: Other Processing

If the trigger is caused by the event (5) in step Sa4, the CPU 10 executes processing corresponding to that trigger and then returns to step Sa2.

3: Mixer Effects

Figure 12:
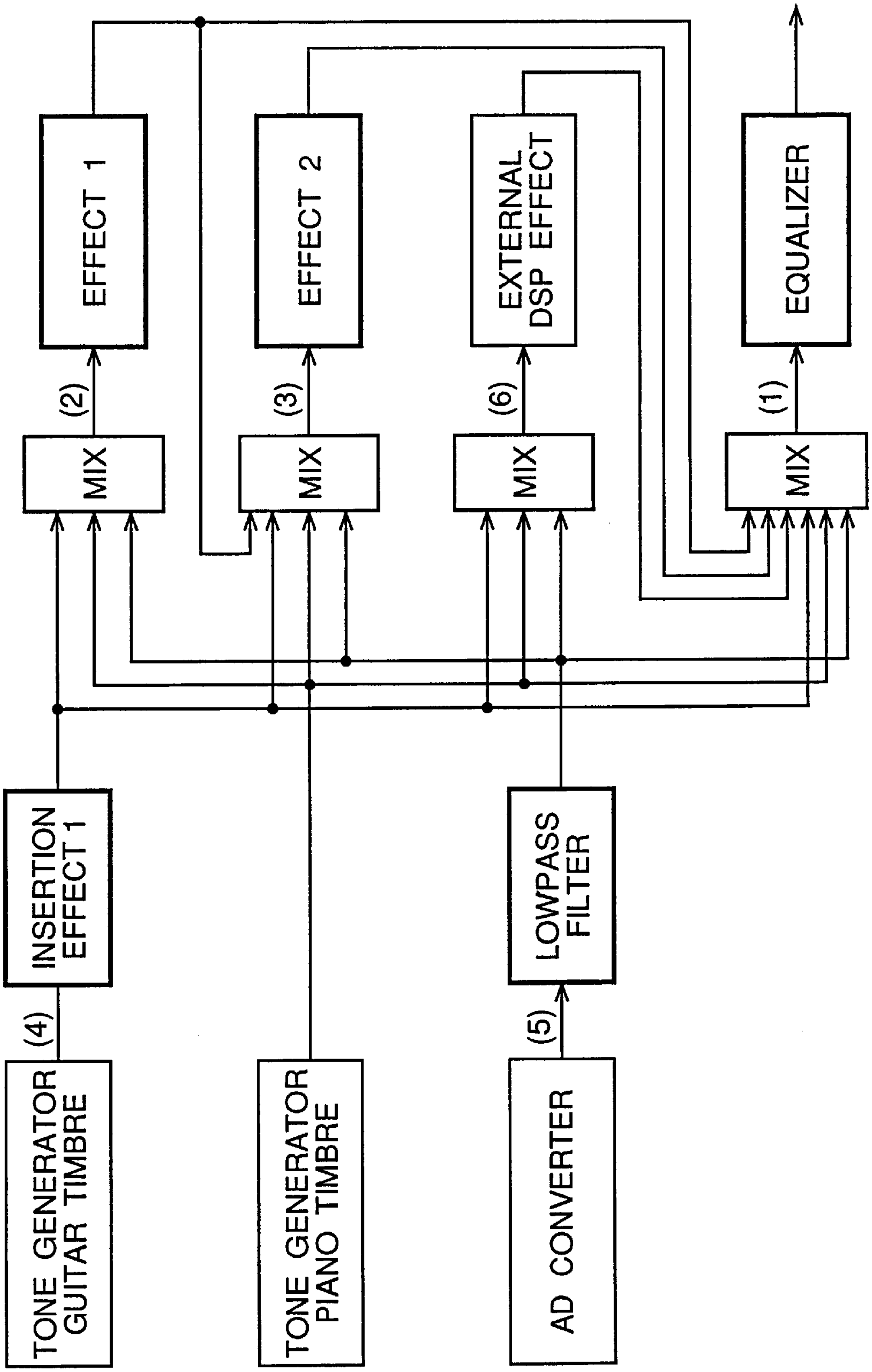
FIG. 12 is a block diagram illustrating one example of effect blocks to be constructed by the above-mentioned mixing apparatus together with an internal DSP and an external circuit.

The internal DSP 205 in the above-mentioned electronic musical instrument constitutes a set of effect imparting means or effect blocks for imparting certain sound effects to voice signals. This holds true for the external DSP 264 in the external circuit 260. The following describes an example in which an effect algorithm as shown in FIG. 12 is built by use of the internal DSP 205 and the external DSP 264. Referring to FIG. 12, the internal DSP 205 sets five effects as indicated by thick blocks including insertion effect 1, lowpass filter, effect 1, effect 2, and equalizer. The external DSP 264 sets one effect, namely, external DSP effect. The mixer sets five stereo input/output channels (1) to (5) for the internal DSP and one stereo input/output channel (6) for the external DSP.

Figure 13:
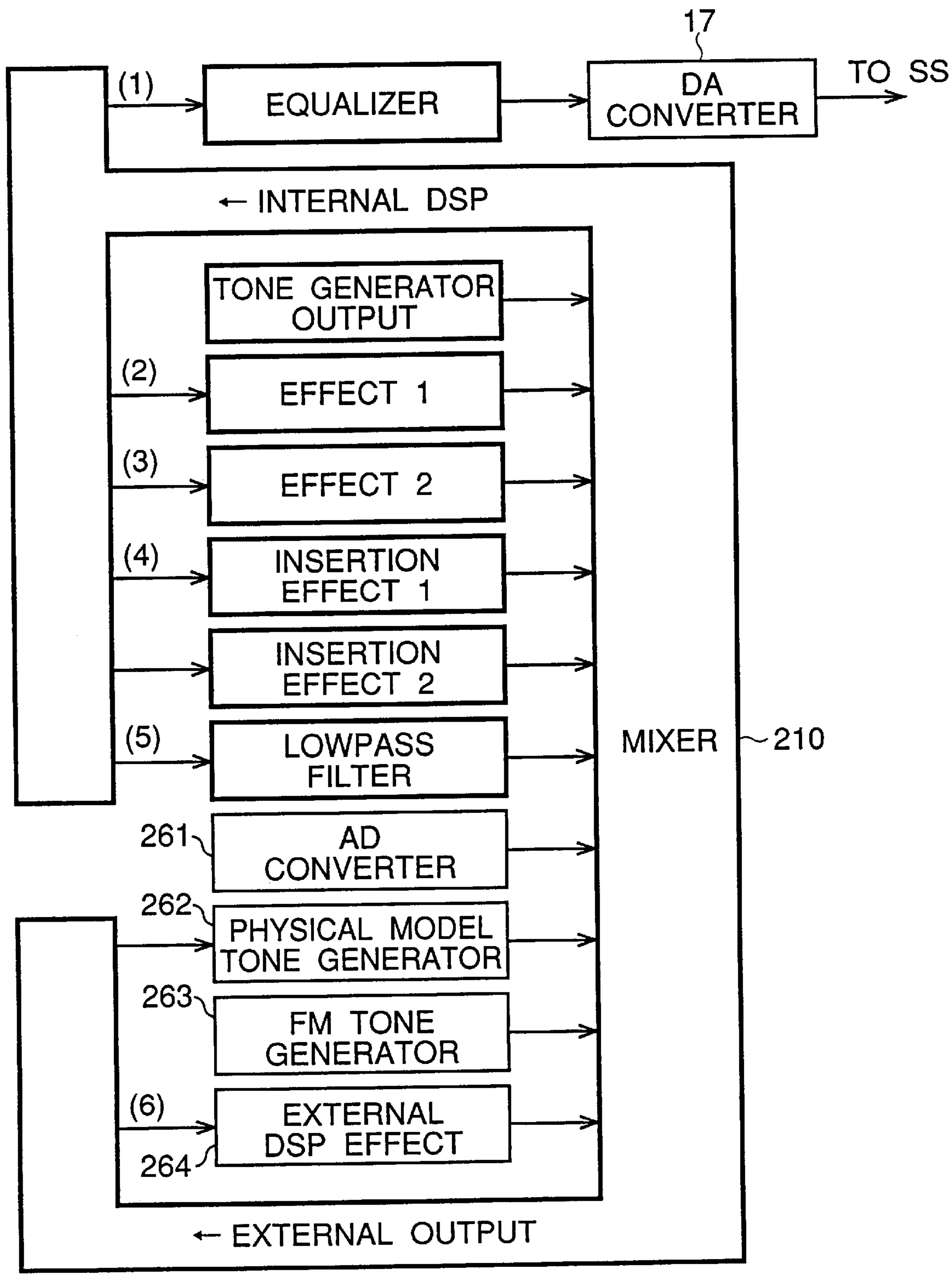
FIG. 13 is a block diagram describing relationship between the internal DSP in the above-mentioned mixing apparatus and the external circuit.

In the constitution shown in FIG. 12, the mixer can handle the input/output for the effect blocks in the internal DSP 205 and the input/output for the effect blocks in the external DSP 264 as shown in FIG. 13. This allows the user, when constructing a desired effect algorithm, to be unaware of the distinction between the effect blocks of the internal DSP 205 and the effect blocks of the external DSP 264. This in turn reduces the labor of the user in algorithm construction and mixer setting. Because the effect blocks of the internal DSP 205 need not be distinguished from the effect blocks of the external DSP 264, additional external DSPs can be installed in the same positioning as the internal DSP 205 and the external DSP 264. Therefore, the mixer 210 according to the present embodiment allows the user to be unaware of the functional expansion, thereby facilitating the construction of more complicated effect blocks.

As seen from FIG. 13, the mixer 210 can handle the internal sound source output and the external output supplied through the A/D converter 261 in the same manner. This also reduces the labor of the user in effect algorithm construction and mixer setting.

It should be noted that, in FIG. 12, the sound source generates different timbres at the same time. Therefore, the mixer can be set such that guitar timbre is generated in one area of the keyboard 15 and piano timbre is generated in another area, for example. In this case, of the 64 sound channels, the channel to which the note corresponding to the key pressing of guitar timbre is assigned is set with the timbre control data for guitar timbre in the corresponding area of the control register. For the channel to which the note corresponding to the key pressing of piano timbre is assigned, the timbre control data for piano timbre is assigned. The outputs of plural channels that are sounding guitar timbre are mixed by the mixer (4) to be supplied to the insertion effect being executed by the internal DSP. The setting of the mixer (4) is carried out based on assignment information A4. To the assignment information A for other than the mixer (4), the value "000" indicating "not output" is set.

On the other hand, the outputs of plural channels that are sounding piano timbre are mixed by the mixer (1) (A1), the mixer (2) (A2), the mixer (3) (A3), and the mixer (6) (A9) to be supplied to the corresponding effect blocks. The output of the external A/D converter 261 is supplied to the lowpass filter through the mixer (5). The output of the equalizer is supplied from the internal DSP to the DAC 17. The control register 201 can be set such that any one of 16 mixer outputs is selected to be written as waveform data to the waveform memory through the read circuit.

According to the present embodiment shown in FIG. 13, the external circuits such as the A/D converter, the external tone generator, and the external DSP can be handled in the same manner as the internal tone generator and the internal DSP integrated in the semiconductor chip of the sound mixing apparatus. Therefore, the capabilities of the sound source 200 can be expanded with ease and without restriction. Referring to FIGS. 12 and 13, the insertion effect denotes a timbre-unique effect block. The effect blocks shown in FIG. 13 are for illustrative purposes only, and therefore these effect blocks are not all the blocks that can be constructed in the internal DSP 205. This holds true for the external DSP 264.

The mixer according to the present embodiment shares the accumulator for accumulating the outputs of the internal circuit 205 and the external DSP 264 thereby simplifying the circuit scale as a whole. In addition, the mixer 210 processes voice signals on a stereo basis, thereby simplifying the handling of the mixer for both the user and the electronic musical instrument associated with the present invention. For example, the mixer 210 obtains 4 multiplication results for the L and R parts for one input channel ch, a total of 8 multiplication results. The number of multiplication coefficients for these computations is no more than 6; one for pan information L, one for pan information R, and four for level information S1 to S4. This simplifies notation of various control parameters.

4: Others

In the above-mentioned embodiment, the control information about the setting #(n) is set by means of the switch panel 13. Alternatively, a screen emulating the switch panel may be displayed on the display 14 to make the setting by operating this screen in the manner of so-called GUI (Graphical User Interface). In the above-mentioned embodiment, the generation of music tones is controlled according to keyboard operation. The present invention is not limited to this control method. The generation of music tones may also be controlled according to MIDI events such as note-on and note-off signals inputted from a MIDI terminal. Performance input is not limited to the example of one part and two parts in the above-mentioned embodiment. Sixteen MIDI parts or more performance parts may be inputted. In this case, timbres may be set for each part, thereby realizing ensemble performance by multiple instruments having different timbres.

The present invention covers the machine readable medium 16*a* (FIG. 1) for use in the mixing apparatus having the CPU 10 for mixing input voice signals with each other to produce output voice signals. The medium 16*a* contains program instructions executable by the CPU 10 to cause the mixing apparatus to perform the method comprising the steps of internally generating a predetermined number of input voice signals through the predetermined number of internal channels at each sample period divided into the predetermined number of timeslots to accommodate the predetermined number of the input voice signals within each sample period, converting division of the sample period so as to increase a total number of the timeslots within each sample period, distributing the predetermined number of the input voice signals to the increased number of the timeslots so as to create an extra number of free timeslots within each sample period, receiving the extra number of input voice signals from the extra number of external channels of an external signal source through an interface, allocating the extra number of the input voice signals to the extra number of the free timeslots so as to accommodate the total number of the input voice signals within each sample period, and mixing the total number of the input voice signals with one another to produce the output voice signals.

Preferably, the step of mixing weights the input voice signals, pans the input voice signals and accumulates the input voice signals to produce each of stereophonic output voice signals. Preferably, the step of mixing successively accumulates the total number of the input voice signals throughout the sample period so as to produce each of the output voice signals. In such a case, the method further comprises the step of detecting when overflow occurs during successive accumulation of the input voice signals in order to save the output voice signal from an affect of the overflow.

Preferably, the method further comprises the step of setting control information to each of the input voice signals, the control information being compatible to all of the input voice signals without discrimination between the internally generated input voice signals and the externally provided input voice signals. In such a case, the step of mixing mixes all of the input voice signals with one another to produce each of the output voice signals according to the control information so that the extra number of the input voice signals provided by the external signal source can be treated equivalently to the predetermined number of the input voice signals generated internally.

As mentioned above and according to the invention, there is provided the sound mixing apparatus that is small in circuit scale as a whole and easy in the expansion of capabilities and handling of external outputs.

What is claimed is:

1. A sound apparatus for synthesizing M channels of output voice signals from m channels of input voice signals, comprising:

first providing means for providing n channels of input voice signals at a frame period that is arranged with n number of timeslots to accommodate the n channels of the input voice signals;

rearranging means for rearranging the timeslots so as to increase the number of the timeslots from n to m within the frame period, and for distributing the n channels of the input voice signals to the rearranged timeslots so as to create m-n number of free timeslots within the frame period;

second providing means disposed separately from the first providing means for providing at most m-n channels of input voice signals in addition to the n channels of the input voice signals;

allocating means for allocating at most the m-n channels of the input voice signals to the m-n number of the free timeslots so as to accommodate within the frame period the m channels of the input voice signals provided from both of the first providing means and the second providing means; and mixing means for mixing the m channels of the input voice signals with one another by time-division manner of the m channels to produce the M channels of the output voice signals.

2. The sound apparatus according to claim 1, further comprising setting means for setting control information to each of the m channels of the input voice signals, the control information containing a pair of pan parameters effective to stereophonically locate each input voice signal, k number of level parameters effective to determine different volumes of each input voice signal, and M/2 number of assignment parameters effective to assign each input voice signal to M/2 number of stereo channels comprised of the M channels of the output voice signals, wherein the mixing means multiplies each input voice signal by 2k number of coefficients derived from combination of the pair of the pan parameters and the k number of the level parameters to produce 2k number of variations of each input voice signal, and then selectively assigns the 2k number of the variations to each of the M/2 number of the stereo channels according to each of the M/2 number of the assignment parameters.

3. The sound apparatus according to claim 1, wherein the mixing means successively accumulates the m channels of the input voice signals throughout the frame period for each of the M channels to produce the output voice signals, the apparatus further comprising detecting means for detecting when overflow occurs at one or more of the M channels during successive accumulation of the input voice signals in order to remove the overflow.

4. The sound apparatus according to claim 1, further comprising setting means for setting control information to each of the m channels of the input voice signals, the control information being compatible to all of the input voice signals, wherein the mixing means mixes the m channels of the input voice signals with one another to produce the M channels of the output voice signals according to the control information so that the m-n number of the input voice signals provided by the second providing means can be treated by the mixing means equivalently to the n number of the input voice signals provided by the first providing means.

5. An integrated circuit device for use in music applications, comprising:

a tone generator section for generating music tone signals through a plurality of time-divisional channels;

an input section for receiving music tone signals that are externally inputted;

a processor section for modifying waveforms of at least one of the music tone signals;

an output section for externally transmitting at least one of the music tone signals;

a register section for registering control information; and a mixer section for mixing the music tone signals fed from the tone generator section, the input section and the processor section with one another according to the control information, and for feeding the mixed music tone signals to the processor section and the output section according to the control information, wherein the control information is set compatible to all of the music tone signals fed from the tone generator section, the input section and the processor section without discrimination among the tone generator section, the input section and the processor section, and the control information is set compatible to both of the music tone signals fed to the processor section and the output section without discrimination between the processor section and the output section.

6. A mixing apparatus for mixing input voice signals with each other to produce output voice signals, the apparatus comprising:

a generator that has a predetermined number of internal channels for internally generating the predetermined number of input voice signals at each sample period divided into the predetermined number of timeslots to accommodate the predetermined number of the input voice signals within each sample period;

a converter that converts division of the sample period so as to increase a total number of the timeslots within each sample period, and that distributes the predetermined number of the input voice signals to the increased number of the timeslots so as to create an extra number of free timeslots within each sample period;

an interface for receiving the extra number of input voice signals provided from the extra number of external channels of an external signal source disposed separately from the generator;

a selector that allocates the extra number of the input voice signals to the extra number of the free timeslots so as to accommodate within each sample period the total number of the input voice signals provided concurrently from both of the generator and the interface; and a processor that mixes the total number of the input voice signals with one another to produce the output voice signals.

7. The mixing apparatus according to claim 6, wherein the processor weights the input voice signals, pans the input voice signals and accumulates the input voice signals to produce each of stereophonic output voice signals.

8. The mixing apparatus according to claim 6, wherein the processor successively accumulates the total number of the input voice signals throughout the sample period so as to produce each of the output voice signals, the apparatus further comprising a detector provided for detecting when overflow occurs during successive accumulation of the input voice signals in order to save the output voice signal from the overflow.

9. The mixing apparatus according to claim 6, further comprising a register provided for setting control information to each of the input voice signals, the control information being compatible to all of the input voice signals without discrimination between the internally generated input voice signals and the externally provided input voice signals, wherein the processor mixes all of the input voice signals with one another to produce each of the output voice signals according to the control information so that the extra number of the input voice signals provided by the external signal source can be treated by the processor equivalently to the predetermined number of the input voice signals generated internally by the generator.

10. The mixing apparatus according to claim 6, wherein the interface is connectable to the external signal source composed of an optional device selected from an external tone generator for generating an input voice signal, an analog-to-digital converter for converting an input voice signal from analog to digital, and a digital signal processor for digitally processing an input voice signal.

11. A method of mixing input voice signals with each other to produce output voice signals, comprising the steps of:

internally generating a predetermined number of input voice signals through the predetermined number of internal channels at each sample period divided into the predetermined number of timeslots to accommodate the predetermined number of the input voice signals within each sample period;

converting division of the sample period so as to increase a total number of the timeslots within each sample period;

distributing the predetermined number of the input voice signals to the increased number of the timeslots so as to create an extra number of free timeslots within each sample period;

receiving the extra number of input voice signals from the extra number of external channels of an external signal source through an interface;

allocating the extra number of the input voice signals to the extra number of the free timeslots so as to accommodate the total number of the input voice signals within each sample period; and mixing the total number of the input voice signals with one another to produce the output voice signals.

12. The method according to claim 11, wherein the step of mixing weights the input voice signals, pans the input voice signals and accumulates the input voice signals to produce each of stereophonic output voice signals.

13. The method according to claim 11, wherein the step of mixing successively accumulates the total number of the input voice signals throughout the sample period so as to produce each of the output voice signals, the method further comprising the step of detecting when overflow occurs during successive accumulation of the input voice signals in order to save the output voice signal from an affect of the overflow.

14. The method according to claim 11, further comprising the step of setting control information to each of the input voice signals, the control information being compatible to all of the input voice signals without discrimination between the internally generated input voice signals and the externally provided input voice signals, wherein the step of mixing mixes all of the input voice signals with one another to produce each of the output voice signals according to the control information so that the extra number of the input voice signals provided by the external signal source can be treated equivalently to the predetermined number of the input voice signals generated internally.

15. A machine readable medium for use in a mixing apparatus having a CPU for mixing input voice signals with each other to produce output voice signals, the medium containing program instructions executable by the CPU to cause the mixing apparatus to perform the method comprising the steps of:

internally generating a predetermined number of input voice signals through the predetermined number of internal channels at each sample period divided into the predetermined number of timeslots to accommodate the predetermined number of the input voice signals within each sample period;

converting division of the sample period so as to increase a total number of the timeslots within each sample period;

distributing the predetermined number of the input voice signals to the increased number of the timeslots so as to create an extra number of free timeslots within each sample period;

receiving the extra number of input voice signals from the extra number of external channels of an external signal source through an interface;

allocating the extra number of the input voice signals to the extra number of the free timeslots so as to accommodate the total number of the input voice signals within each sample period; and mixing the total number of the input voice signals with one another to produce the output voice signals.

16. The machine readable medium according to claim 15, wherein the step of mixing weights the input voice signals, pans the input voice signals and accumulates the input voice signals to produce each of stereophonic output voice signals.

17. The machine readable medium according to claim 15, wherein the step of mixing successively accumulates the total number of the input voice signals throughout the sample period so as to produce each of the output voice signals, and wherein the method further comprises the step of detecting when overflow occurs during successive accumulation of the input voice signals in order to save the output voice signal from an affect of the overflow.

18. The machine readable medium according to claim 15, wherein the method further comprises the step of setting control information to each of the input voice signals, the control information being compatible to all of the input voice signals without discrimination between the internally generated input voice signals and the externally provided input voice signals, and wherein the step of mixing mixes all of the input voice signals with one another to produce each of the output voice signals according to the control information so that the extra number of the input voice signals provided by the external signal source can be treated equivalently to the predetermined number of the input voice signals generated internally.

19. A sound source apparatus comprising:

an internal generator having a plurality of channels adapted to successively generate a plurality of waveform data by a time-division manner in correspondence to the plurality of the channels and successively outputting each of the waveform data from each of the channels at a timing matching the time-division manner;

an interface having a channel and being connectable to a generator board which generates waveform data such that the interface can output the waveform data from the interface channel at a given timing when the generator board is connected to the interface; and a mixer adapted to collect the waveform data through the respective channels of the internal generator and the interface, and mix the collected waveform data with each other such that the mixer can treat the waveform data generated by the generator board compatibly with the waveform data generated by the internal generator, wherein the internal generator, the interface and the mixer are integrated into a single semiconductor chip.

20. A sound source apparatus comprising:

an internal generator having a plurality of channels adapted to successively generate a plurality of waveform data by a time-division manner in correspondence to the plurality of the channels and successively output each of the waveform data in a parallel bit form from each of the plurality of channels at a timing matching the time-division manner;

an interface having a channel and being connectable to a generator board which generates waveform data in a serial bit form, the interface adapted to convert the waveform data from the serial bit form into parallel bit form such that the interface can output the waveform data in the parallel bit form from the interface channel at a given timing when the generator board is connected to the interface; and a mixer adapted to collect all the waveform data having the parallel bit form through the respective channels of the internal generator and the interface, and mixing the collected waveform data with each other such that the mixer can treat the waveform data generated by the generator board compatibly with the waveform data generated by the internal generator, wherein the internal generator, the interface and the mixer are integrated into a single semiconductor chip.

21. An effector apparatus comprising:

a source device adapted to provide waveform data;

an internal effector adapted to receive the waveform data, apply an effect to the waveform data, and thereafter output the waveform data;

an interface connectable to an effect board for applying an effect to the waveform data fed from the source device through the interface, and being for feeding back the waveform data through the interface after the effect is applied; and a mixer adapted to mix at least two of the waveform data provided from the source device, the waveform data outputted from the internal effector and the waveform data fed back from the effect board through the interface, the mixer for reoutputting the mixed waveform data to either the internal effector or the effect board, such that the internal effector and the effect board can cooperate with each other for applying the effect to the waveform data, wherein the internal effector, the interface and the mixer are integrated into a single semiconductor chip.

22. An effector apparatus comprising:

a source device adapted to provide waveform data;

an internal effector adapted to receive the waveform data, apply an effect to the waveform data, and thereafter output the waveform data;

an interface connectable to an effect board which treats a serial bit form of the waveform data while the source device and the internal effector treat a parallel bit form of the waveform data, the interface for interchangeably converting the waveform data between the serial bit form and the parallel bit form, thereby enabling the effect board to apply an effect to the serial bit form of the waveform data fed from the source device through the interface, and enabling the effect board to feed back the parallel bit form of the waveform data through the interface after the effect is applied; and a mixer adapted to mix at least two of the waveform data provided from the source device, the waveform data outputted from the internal effector and the waveform data fed back from the effect board through the interface, the mixer for reoutputting the mixed waveform data to either the internal effector or the effect board through the interface, such that the internal effector and the effect board can cooperate with each other for applying the effect to the waveform data, wherein the internal effector, the interface and the mixer are integrated into a single semiconductor chip.

23. An integrated circuit device comprising:

a generator section adapted to generate waveform data;

an input section adapted to input waveform data which is provided from an external circuit;

an output section adapted to output waveform data to an external circuit;

an effector section adapted to apply an effect to waveform data inputted to the effector section, and then output the waveform data; and a mixer section adapted to mix at least two of the waveform data generated by the generator section, the waveform data inputted from the input section, and the waveform data outputted from the effector section, the mixer section adapted to output the mixed waveform data to either the output section or the effector section, wherein the input section and the output section can connect to an external circuit having a capability of at least one of generating waveform data, inputting waveform data and applying an effect to waveform data to thereby expand functions of at least one of the generator section, the effector section and the mixer section.

24. A method of mixing waveform data comprising the steps of:

successively generating a plurality of waveform data by an internal generator integrated into a semiconductor chip and having a plurality of channels in a time-division manner in correspondence to the plurality of the channels;

successively outputting each of the waveform data from each of the channels at a timing matching the time-division manner;

activating an interface integrated into said semiconductor chip and having a channel to connect a generator board which generates waveform data such that the interface can output the waveform data from the channel at a given timing after the generator board is connected to the interface;

collecting the waveform data by a mixer, integrated into said semiconductor chip, through the respective channels of the internal generator and the interface; and mixing the collected waveform data with each other such that the mixer can treat the waveform data generated by the generator board compatibly with the waveform data generated by the internal generator.

25. A method of mixing waveform data comprising the steps of:

successively generating a plurality of waveform data by an internal generator integrated into a semiconductor chip and having a plurality of channels in a time-division manner in correspondence to the plurality of the channels;

successively outputting each of the waveform data in a parallel bit form from each of the channels at a timing matching the time-division manner;

activating an interface integrated into said semiconductor chip and having a channel to connect a generator board which generates waveform data in a serial bit form, the interface for converting the waveform data from the serial bit form into parallel bit form such that the interface can output the waveform data in the parallel bit form from the interface channel at a given timing after the generator board is connected to the interface;

collecting all the waveform data having the parallel bit form through the respective channels of the internal generator and the interface; and mixing the collected waveform data with each other by a mixer, integrated into said semiconductor chip, such that the mixer can treat the waveform data generated by the generator board compatibly with the waveform data generated by the internal generator.

26. A method of applying an effect to waveform data comprising the steps of:

providing waveform data from a source device;

operating an internal effector, integrated into a semiconductor chip, to receive the waveform data, then to apply an effect to the waveform data, and thereafter to output the waveform data;

activating an interface, integrated into said semiconductor chip, to connect an effect board for applying an effect to the waveform data fed from the source device, the effect board being capable of feeding back the waveform data through the interface after the effect is applied;

mixing by a mixer, integrated into said semiconductor chip, at least two of the waveform data provided from the source device, the waveform data outputted from the internal effector and the waveform data fed back from the effect board through the interface; and outputting the mixed waveform to either the internal effector or the effect board such that the internal effector and the effect board can cooperate with each other in applying the effect to the waveform data.

27. A method of applying an effect to waveform data comprising the steps of:

providing waveform data from a source device;

operating an internal effector, integrated into a semiconductor chip, to receive the waveform data, then to apply an effect to the waveform data, and thereafter to output the waveform data;

activating an interface, integrated into said semiconductor chip, to connect an effect board which treats a serial bit form of the waveform data while the source devices and the internal effector treat a parallel bit form of the waveform data, the interface for interchangeably converting the waveform data between the serial bit form and the parallel bit form, thereby enabling the effect board to apply an effect to the serial bit form of the waveform data fed from the source device through the interface, and enabling the effect board to feed back the parallel bit form of the waveform data through the interface after the effect is applied;

mixing by a mixer, integrated into said semiconductor chip, at least two of the waveform data provided from the source device, the waveform data outputted from the internal effector and the waveform data fed back from the effect board through the interface; and outputting the mixed waveform data to either the internal effector or the effect board through the interface, such that the internal effector and the effect board can cooperate with each other in applying the effect to the waveform data.

28. A machine readable medium for use in a mixer apparatus having a CPU for mixing waveform data, the medium containing program instructions executable by the CPU to cause the mixer apparatus to perform a method comprising the steps of:

successively generating a plurality of waveform data by an internal generator integrated into a semiconductor chip and having a plurality of channels in a time-division manner in correspondence to the plurality of the channels;

successively outputting each of the waveform data from each of the channels at a timing matching the time-division manner;

activating an interface integrated into said semiconductor chip and having a channel to connect a generator board which generates waveform data such that the interface can output the waveform data from the interface channel at a given timing after the generator board is connected to the interface;

collecting the waveform data by a mixer, integrated into said semiconductor chip, through the respective channels of the internal generator and the interface; and mixing the collected waveform data with each other such that the mixer can treat the waveform data generated by the generator board compatibly with the waveform data generated by the internal generator.

29. A machine readable medium for use in a mixer apparatus having a CPU for mixing waveform data, the medium containing program instructions executable by the CPU to cause the mixer apparatus to perform a method comprising the steps of:

successively generating a plurality of waveform data by an internal generator integrated into a semiconductor chip and having a plurality of channels in a time-division manner in correspondence to the plurality of the channels;

successively outputting each of the waveform data in a parallel bit form from each of the channels at a timing matching the time-division manner;

activating an interface integrated into said semiconductor chip and having a channel to connect a generator board which generates waveform data in a serial bit form, the interface for converting the waveform data from the serial bit form into parallel bit form such that the interface can output the waveform data in the parallel bit form from the interface channel at a given timing after the generator board is connected to the interface;

collecting all the waveform data having the parallel bit form through the respective channels of the internal generator and the interface; and mixing the collected waveform data with each other by a mixer, integrated into said semiconductor chip, such that the mixer can treat the waveform data generated by the generator board compatibly with the waveform data generated by the internal generator.

30. A machine readable medium for use in an effector apparatus having a CPU for applying an effect to waveform data, the medium containing program instructions executable by the CPU to cause the effector apparatus to perform a method comprising the steps of:

providing waveform data from a source device;

operating an internal effector, integrated into a semiconductor chip, to receive the waveform data, then to apply an effect to the waveform data, and thereafter to output the waveform data;

activating an interface, integrated into said semiconductor chip, to connect an effect board for applying an effect to the waveform data fed from the source device, the effector board being capable of feeding back the waveform data through the interface after the effect is applied;

mixing by a mixer, integrated into said semiconductor chip, two or more of the waveform data provided from the source device, the waveform data outputted from the internal effector and the waveform data fed back from the effect board through the interface; and outputting the mixed waveform data to either the internal effector or the effect board such that the internal effector and the effect board can cooperate with each other in applying the effect to the waveform data.

31. A machine readable medium for use in an effector apparatus having a CPU for applying an effect to waveform data, the medium containing program instructions executable by the CPU to cause the effector apparatus to perform a method comprising the steps of:

providing waveform data from a source device;

operating an internal effector, integrated into a semiconductor chip, to receive the waveform data, then to apply an effect to the waveform data, and thereafter to output the waveform data;

activating an interface, integrated into said semiconductor chip, to connect an effect board which treats a serial bit form of the waveform data while the source device and the internal effector treat a parallel bit form of the waveform data, the interface for interchangeably converting the waveform data between the serial bit form and the parallel bit form, thereby enabling the effect board to apply an effect to the serial bit form of the waveform data fed from the source device through the interface, and enabling the effect board to feed back the parallel bit form of the waveform data through the interface after the effect is applied;

mixing by a mixer, integrated into said semiconductor chip, two or more of the waveform data provided from the source device, the waveform data outputted from the internal effector and the waveform data fed back from the effect board through the interface; and outputting the mixed waveform data to either the internal effector and the effect board through the interface, such that the internal effector and the effect board can cooperate with each other in applying the effect to the waveform data.

* * * * *